US010637997B2

(12) United States Patent
Jabara et al.

(10) Patent No.: US 10,637,997 B2
(45) Date of Patent: Apr. 28, 2020

(54) BILLING ENGINE AND METHOD OF USE

(71) Applicant: Mobilitie, LLC, Newport Beach, CA (US)

(72) Inventors: Gary Bernard Jabara, Newport Beach, CA (US); Lloyd Frederick Linder, Agoura Hills, CA (US); Jonathan Mason Buck, Laguna Hills, CA (US); Justin Ryan Best, Lebanon, PA (US); Eric Keith Chun, Mission Viejo, CA (US)

(73) Assignee: Mobilitie, LLC, Newport Beach, CA (US)

( * ) Notice: Subject to any disclaimer, the term of this patent is extended or adjusted under 35 U.S.C. 154(b) by 0 days.

(21) Appl. No.: 16/268,255

(22) Filed: Feb. 5, 2019

(65) Prior Publication Data

US 2019/0174011 A1 Jun. 6, 2019

Related U.S. Application Data

(63) Continuation-in-part of application No. 15/728,287, filed on Oct. 9, 2017, now Pat. No. 10,264,140, which (Continued)

(51) Int. Cl.
*H04W 4/24* (2018.01)
*H04M 15/00* (2006.01)
(Continued)

(52) U.S. Cl.
CPC ........ *H04M 15/8214* (2013.01); *H04L 12/14* (2013.01); *H04L 12/141* (2013.01); *H04L 12/1403* (2013.01); *H04L 63/0892* (2013.01); *H04M 15/8033* (2013.01); *H04M 15/8044* (2013.01); *H04M 15/8055* (2013.01); *H04M 15/8083* (2013.01); *H04M 15/8228* (2013.01); *H04M 15/93* (2013.01); *H04W 4/24* (2013.01); *H04W 8/186* (2013.01); *H04W 12/06* (2013.01);

(Continued)

(58) Field of Classification Search
CPC combination set(s) only.
See application file for complete search history.

(56) References Cited

U.S. PATENT DOCUMENTS

| 9,130,651 B2 * | 9/2015 | Tabe | H04B 1/3838 |
| 9,794,418 B2 * | 10/2017 | Pieda | H04M 15/771 |
| 10,075,925 B2 * | 9/2018 | Lepp | H04W 52/243 |

\* cited by examiner

*Primary Examiner* — An T Luu
(74) *Attorney, Agent, or Firm* — Davis Wright Tremaine LLP; Michael J. Donohue

(57) ABSTRACT

A wireless communication device associated with a mobile operator network transmits an authentication request for network access via a wireless access point (AP) using a network transceiver or a transceiver other than the cellular network transceiver. Device authentication can occur directly with the mobile operator network or via a proxy server. Communications with the authentication server my use VLAN/VRF or NFV depending on the availability of the network communications technology. Upon authentication, the requesting device may access a wide area network in a data off-load operational mode and the data flow to and from the device via the AP is monitored and reported to mobile operator network associated with the requesting device. The wireless communication device can communicate with any of a plurality of APs distributed in a venue during the data off-load operational mode.

35 Claims, 14 Drawing Sheets

Related U.S. Application Data is a continuation of application No. 15/246,165, filed on Aug. 24, 2016, now Pat. No. 9,787,855, which is a continuation of application No. 14/706,869, filed on May 7, 2015, now Pat. No. 9,439,071, which is a continuation-in-part of application No. 13/363,943, filed on Feb. 1, 2012, now Pat. No. 9,179,296, which is a continuation-in-part of application No. 13/093,998, filed on Apr. 26, 2011, now Pat. No. 8,995,923, which is a continuation-in-part of application No. 12/958,296, filed on Dec. 1, 2010, now Pat. No. 9,077,564, which is a continuation-in-part of application No. 12/616,958, filed on Nov. 12, 2009, now Pat. No. 8,190,119, which is a continuation-in-part of application No. 12/397,225, filed on Mar. 3, 2009, now Pat. No. 7,970,351.

(51) Int. Cl.
| | |
|---|---|
| *H04W 12/06* | (2009.01) |
| *H04L 29/06* | (2006.01) |
| *H04W 8/18* | (2009.01) |
| *H04W 24/08* | (2009.01) |
| *H04W 12/08* | (2009.01) |
| *H04L 12/14* | (2006.01) |
| *H04W 76/45* | (2018.01) |
| *H04W 84/12* | (2009.01) |
| *H04L 29/12* | (2006.01) |
| *H04W 8/20* | (2009.01) |
| *H04W 84/18* | (2009.01) |
| *H04W 88/04* | (2009.01) |

(52) U.S. Cl.
CPC ........... *H04W 12/08* (2013.01); *H04W 24/08* (2013.01); *H04L 61/6022* (2013.01); *H04W 8/205* (2013.01); *H04W 76/45* (2018.02); *H04W 84/12* (2013.01); *H04W 84/18* (2013.01); *H04W 88/04* (2013.01)

| CLIENT USERNAME | DATE/TIME | AP NAME | SESSION DURATION | Tx (BYTES) | Rx (BYTES) | RSSI |
|---|---|---|---|---|---|---|
| 73ded5438836719@bst.wlan.mobile1.com | 01/18/2015 17:40:09 UTC | BG-CR-16 | 10min 7sec | 61125 | 109368 | -63 |
| 73ded5438836719@bst.wlan.mobile1.com | 01/19/2015 00:59:44 UTC | BG-CR-29 | 10min 5sec | 68959 | 50223 | -72 |
| 73ded5438836719@bst.wlan.mobile1.com | 01/19/2015 01:09:49 UTC | BG-CR-66 | 5min 2sec | 19571 | 8405 | -74 |
| 73ded5438836719@bst.wlan.mobile1.com | 01/18/2015 01:14:52 UTC | BG-CR-083 | 15min 17sec | 6455 | 4610 | -64 |
| 73ded5438836719@bst.wlan.mobile1.com | 01/19/2015 01:30:09 UTC | BG-CR-05 | 20min 13sec | 33830 | 5819 | -61 |
| 73ded5438836719@bst.wlan.mobile1.com | 01/19/2015 01:55:26 UTC | BG-CR-74 | 5min 0sec | 0 | 0 | -86 |
| dbf681d2a1025b@bst.wlan.mobile2.com | 01/18/2015 07:54:02 UTC | 1-001 | 5min 3sec | 22859 | 4811 | -73 |
| dbf681d2a1025b@bst.wlan.mobile2.com | 01/18/2015 07:59:05 UTC | MGM-CAS-022 | 5min 3sec | 19461 | 4841 | -79 |
| dbf681d2a1025b@bst.wlan.mobile2.com | 01/18/2015 08:04:09 UTC | MGM-CAS-023 | 5min 3sec | 38940 | 16140 | -64 |
| dbf681d2a1025b@bst.wlan.mobile2.com | 01/18/2015 08:09:13 UTC | MGM-CAS-037 | 10min 15sec | 48102 | 1690 | -34 |
| dbf681d2a1025b@bst.wlan.mobile2.com | 01/18/2015 08:24:32 UTC | MGM-HK4-023 | 10min 17sec | 25760 | 6386 | -82 |
| dbf681d2a1025b@bst.wlan.mobile2.com | 01/18/2015 08:34:50 UTC | MGM-HK4-023 | 5min 3sec | 0 | 0 | -57 |
| dbf681d2a1025b@bst.wlan.mobile2.com | 01/18/2015 08:39:54 UTC | MGM-HK4-022 | 5min 3sec | 11977 | 16435 | -60 |
| 8def4ebabbde61d@bst.wlan.mobile3.com | 01/18/2015 19:46:31 UTC | BG-CAS-77 | 5min 3sec | 4077 | 5729 | -52 |
| 8def4ebabbde61d@bst.wlan.mobile3.com | 01/18/2015 19:51:34 UTC | BG-CAS-41 | 5min 3sec | 27903 | 52880 | -68 |
| 8def4ebabbde61d@bst.wlan.mobile3.com | 01/18/2015 19:56:37 UTC | BG-CAS-41 | 25min 12sec | 2636 | 2130 | -66 |
| 8def4ebabbde61d@bst.wlan.mobile3.com | 01/18/2015 20:31:58 UTC | BG-CAS-39 | 5min 3sec | 5497 | 5406 | -63 |
| 8def4ebabbde61d@bst.wlan.mobile3.com | 01/18/2015 20:37:01 UTC | BG-CAS-16 | 20min 8sec | 0 | 0 | -63 |
| 8def4ebabbde61d@bst.wlan.mobile3.com | 01/19/2015 01:37:35 UTC | BG-CAS-39 | 5min 2sec | 78409 | 294594 | -62 |
| 8def4ebabbde61d@bst.wlan.mobile3.com | 01/19/2015 02:42:38 UTC | BG-CAS-17 | 5min 2sec | 25474 | 20926 | -69 |

FIG. 9

BILLING ENGINE AND METHOD OF USE

CROSS REFERENCE OF THE RELATED APPLICATIONS

This application is a continuation-in-part of U.S. patent application Ser. No. 15/728,287 filed Oct. 9, 2017, which is a continuation of U.S. patent application Ser. No. 15/246,165 filed Aug. 24, 2016, now U.S. Pat. No. 9,787,855, which is a continuation of U.S. patent application Ser. No. 14/706,869 filed May 7, 2015, now U.S. Pat. No. 9,439,071, which is a continuation-in-part of U.S. patent application Ser. No. 13/363,943 filed on Feb. 1, 2012, now U.S. Pat. No. 9,179,296, which is a continuation-in-part of U.S. patent application Ser. No. 13/093,998 filed on Apr. 26, 2011, now U.S. Pat. No. 8,995,923, which is a continuation-in-part of U.S. patent application Ser. No. 12/958,296 filed on Dec. 1, 2010, now U.S. Pat. No. 9,077,564, which is a continuation-in-part of U.S. patent application Ser. No. 12/616,958 filed on Nov. 12, 2009, now U.S. Pat. No. 8,190,119, which is a continuation-in-part of U.S. patent application Ser. No. 12/397,225 filed on Mar. 3, 2009, now U.S. Pat. No. 7,970,351, the entire disclosures and content of which are hereby incorporated by reference in their entirety.

BACKGROUND OF THE INVENTION

Field of the Invention

The present invention is directed generally to wireless communication devices and, more particularly, to a system and method of network management to permit the dynamic measurement of data utilization by wireless communication devices.

Description of the Related Art

Wireless communication networks have become commonplace. A vast array of base stations is provided by a number of different wireless service providers. Wireless communication devices, such as cell phones, personal communication system (PCS) devices, personal digital assistant (PDA) devices, and web-enabled wireless devices communicate with the various base stations using one or more known communication protocols. While early cell phone devices were limited to analog operation and voice-only communication, modern wireless devices use digital signal protocols and have sufficient bandwidth to enable the transfer of voice signals, image data, and even video streaming. In addition, web-enabled devices provide network access, such as Internet access.

The individual wireless communication devices communicate with one or more base stations. Even when two wireless communication devices are located a few feet from each other, there is no direct communication between the wireless devices. That is, the wireless devices communicate with each other via one or more base stations and other elements of the wireless communication network.

In some situations, mobile operator networks may off-load communication so that the wireless communication devices communicate with the mobile operator network via a wireless access point. Data exchanges (i.e., uploads and downloads) with a wireless communication device are not tracked when using a wireless access point.

Therefore, it can be appreciated that there is a need for a system that can track data utilization of a wireless communication device whether the device is connected to the mobile provider network via cell sites or via a wireless access point. The present invention provides this, and other advantages, as will be apparent from the following detailed description and accompanying figures.

BRIEF DESCRIPTION OF THE SEVERAL VIEWS OF THE DRAWING(S)

FIG. 9 is an example table illustrating the data utilization for multiple wireless communication devices.

Figure 8:
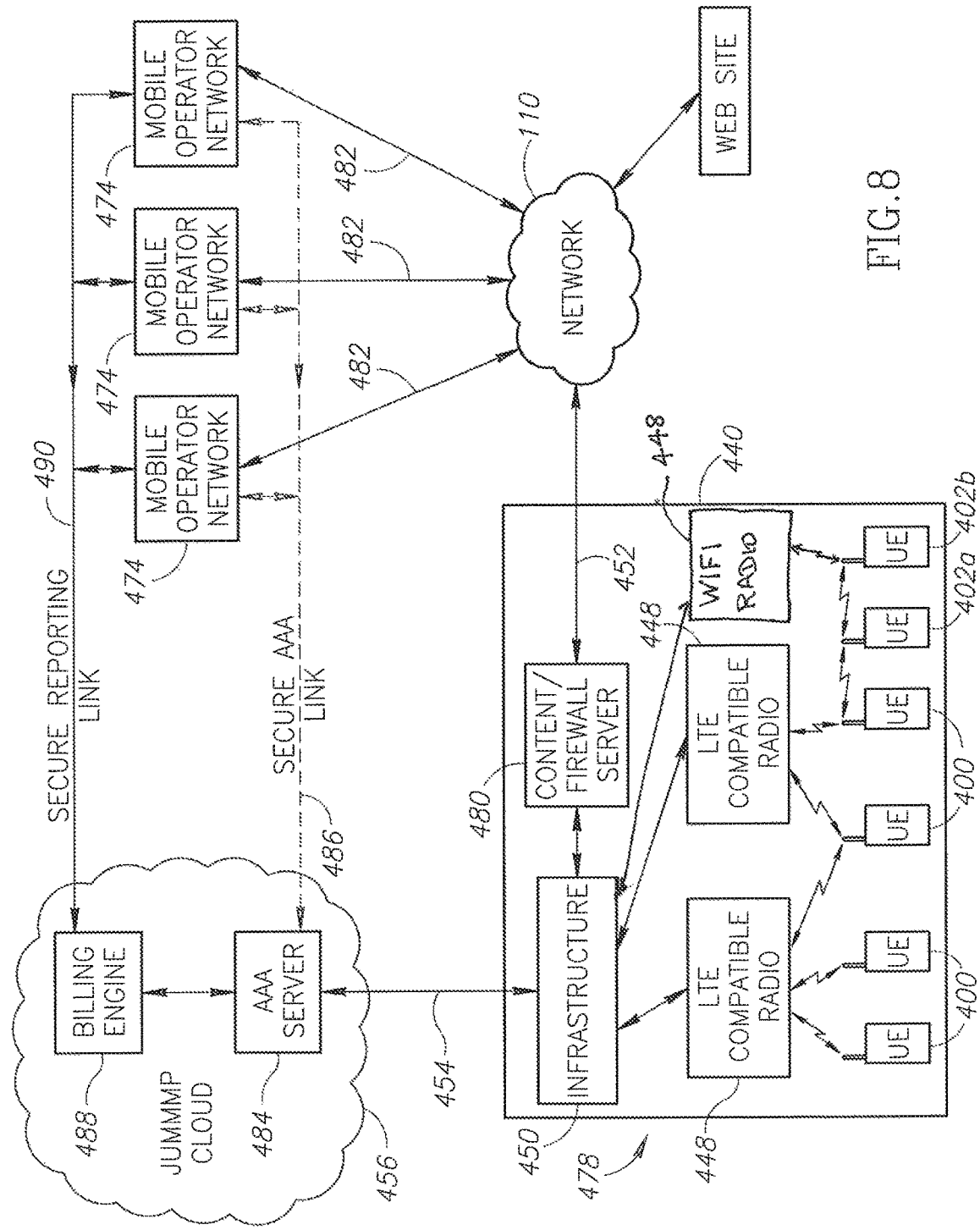
FIG. 8 illustrates a system architecture in which a venue monitors off-loaded data utilization.
Figure 10A:
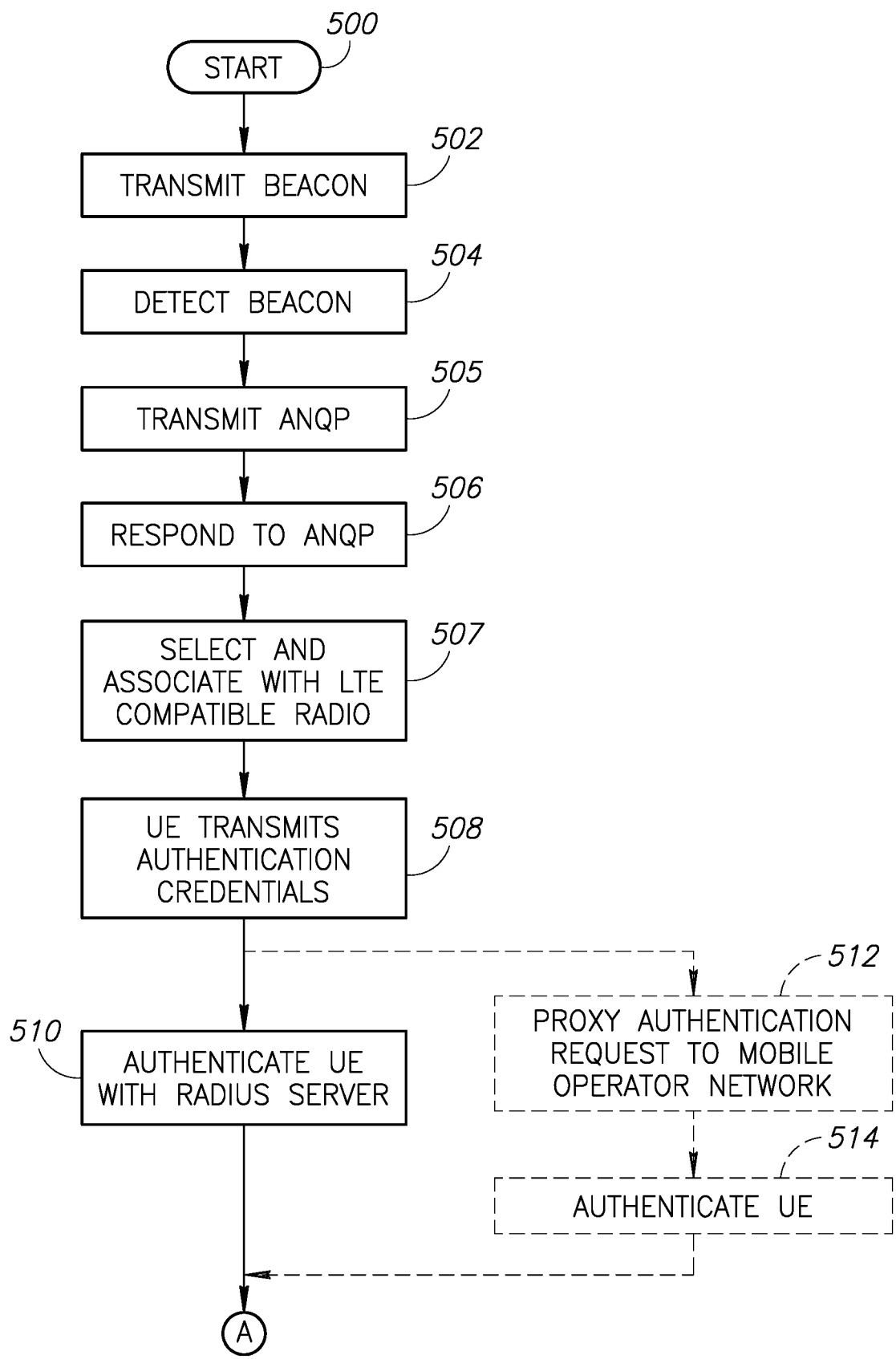
Figure 10B:
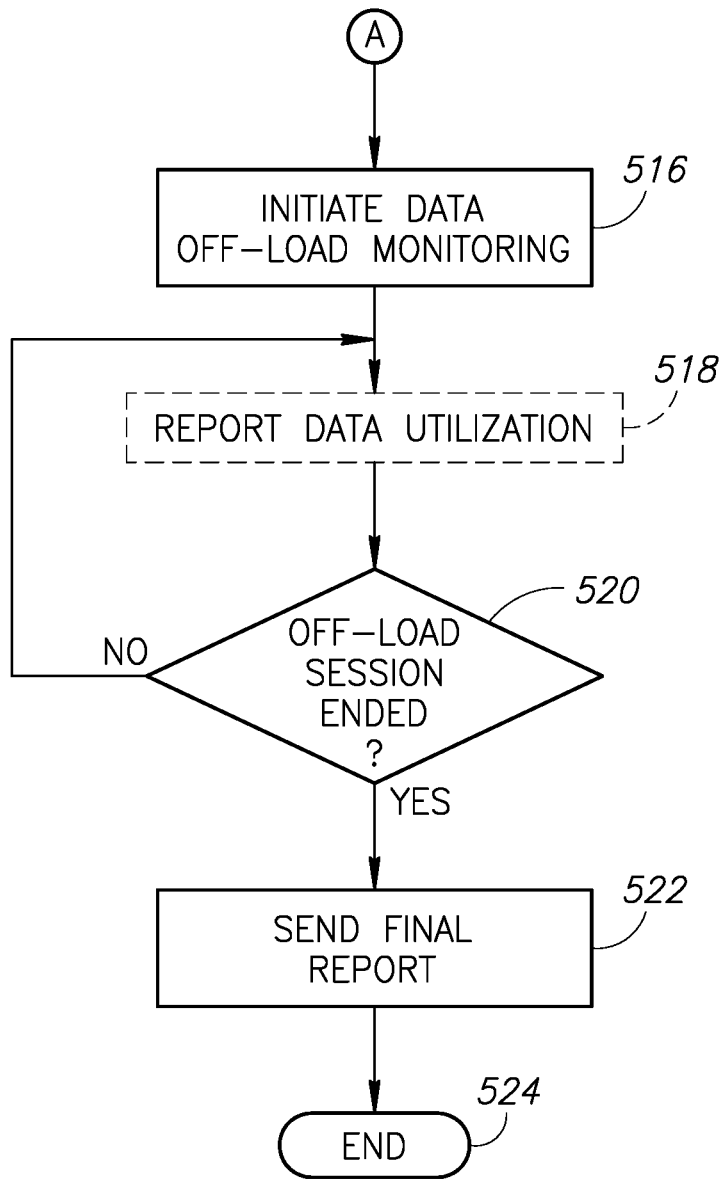

FIGS. 10A-10B together form a flow chart illustrating the operation of the system illustrated in FIG. 8.

Figure 11:
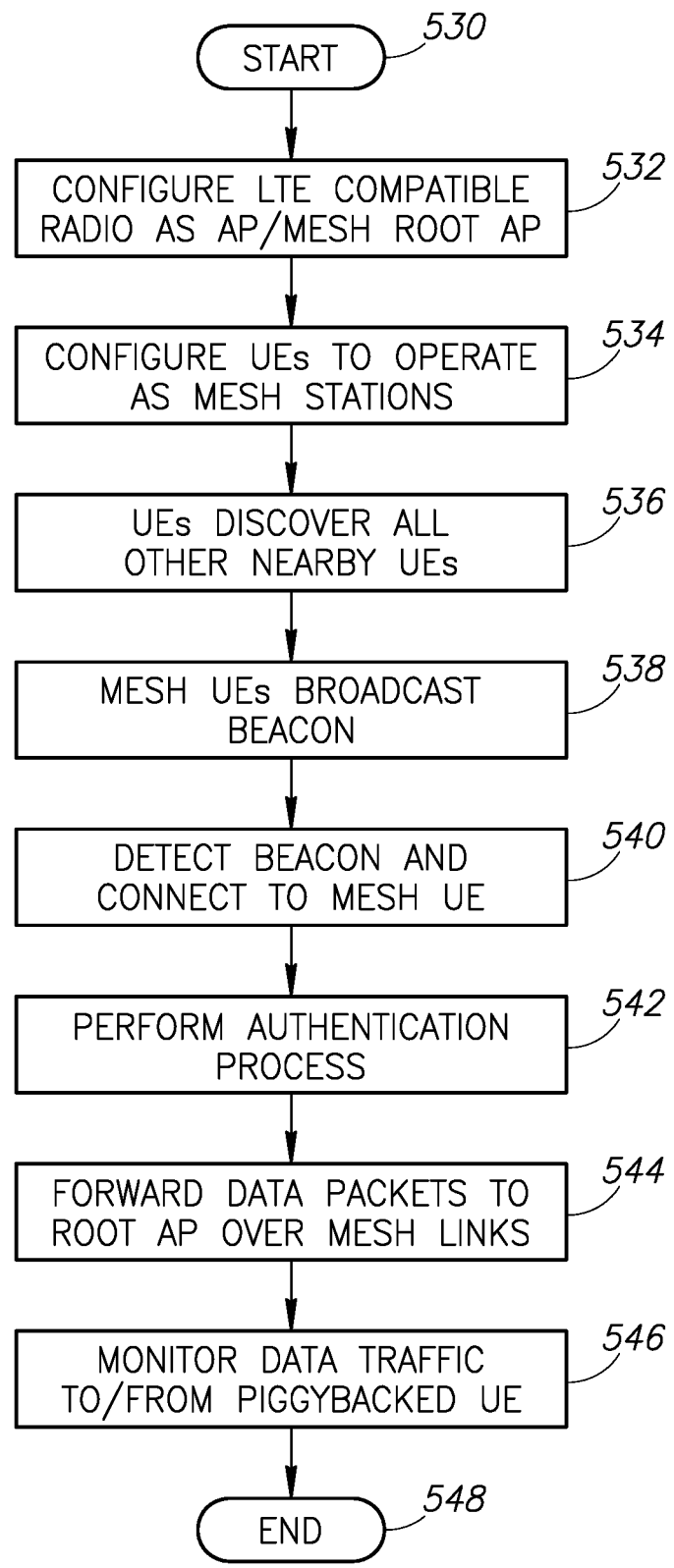

FIG. 11 is a flow chart illustrating the operation of the system illustrated in FIG. 8 for connection to a network via another wireless communication device.

Figure 12:
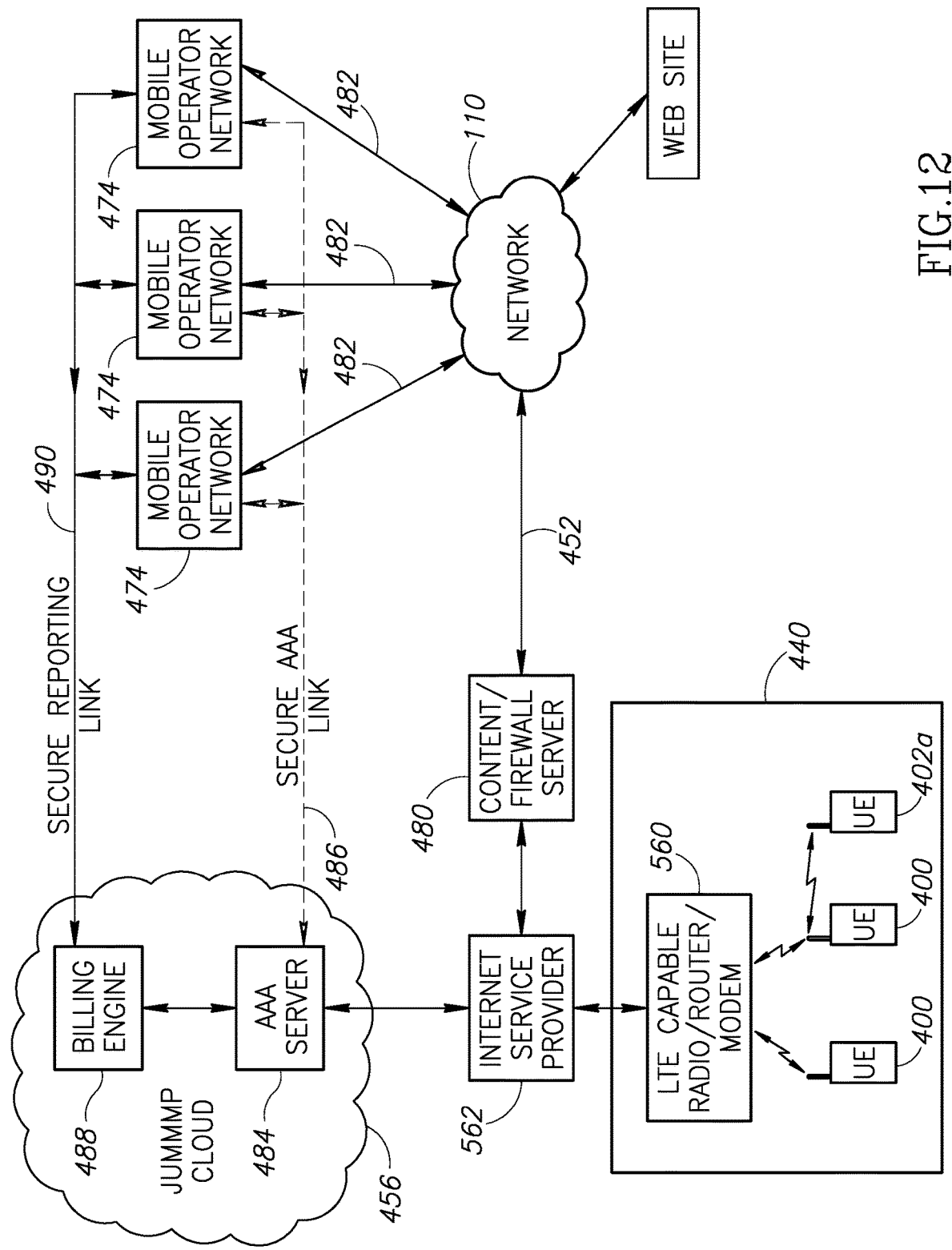

FIG. 12 illustrates a system architecture for small business or home venue to monitor off-loaded data utilization.

Figure 13:
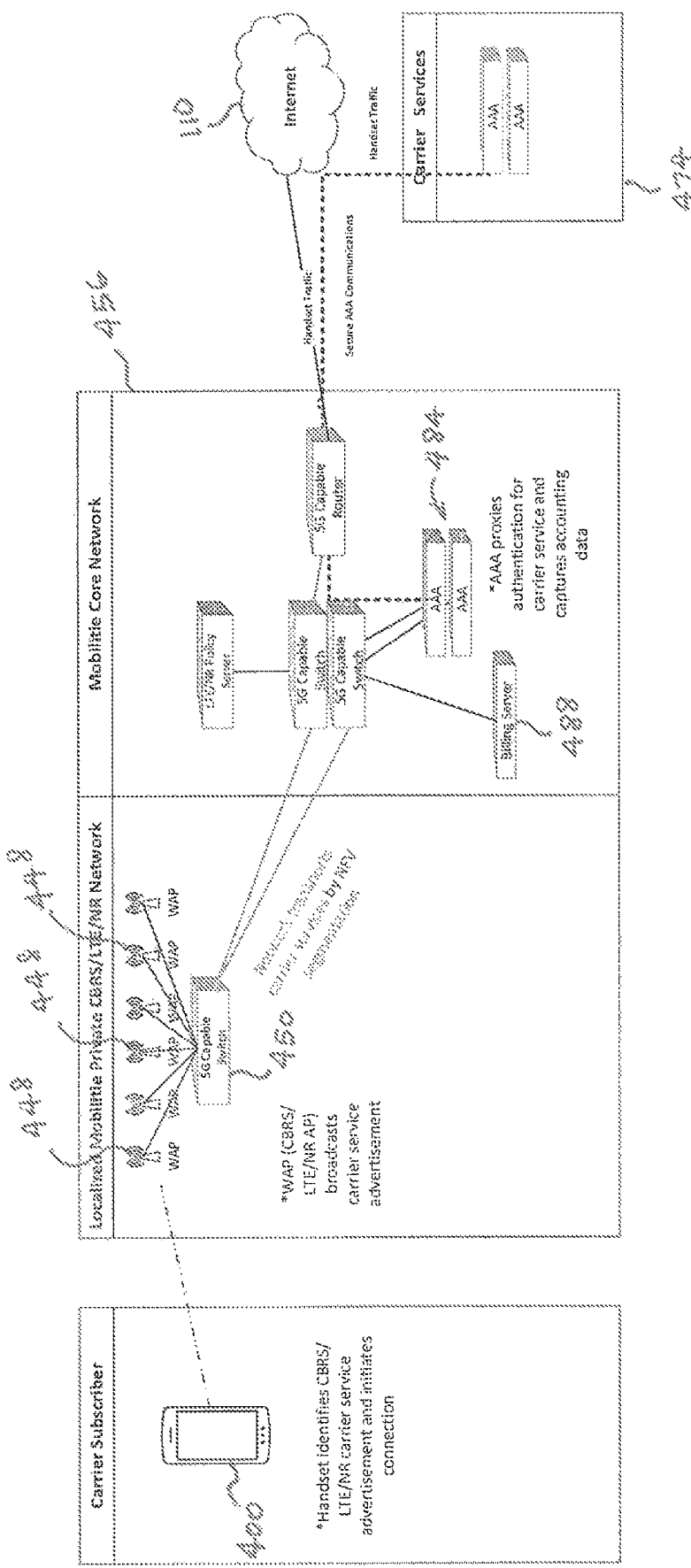

FIG. 13 illustrates a network topology for system implementation using cellular radio functionality.

DETAILED DESCRIPTION OF THE INVENTION

The system described herein extends the normal operational features of conventional wireless communication devices to track data utilization of each wireless communication device. As described above, the conventional wireless communication device communicates with a wireless communication network base station using a first transceiver (i.e., a network transceiver). The extended capabilities described herein provide a second transceiver device that allows wireless communication devices to communicate with the mobile operator network via a wireless access point (AP). As will be described in greater detail below, the system and method described herein permit the mobile operator network to track data utilization by each wireless communication device coupled to the mobile operator network via an AP.

Figure 1:
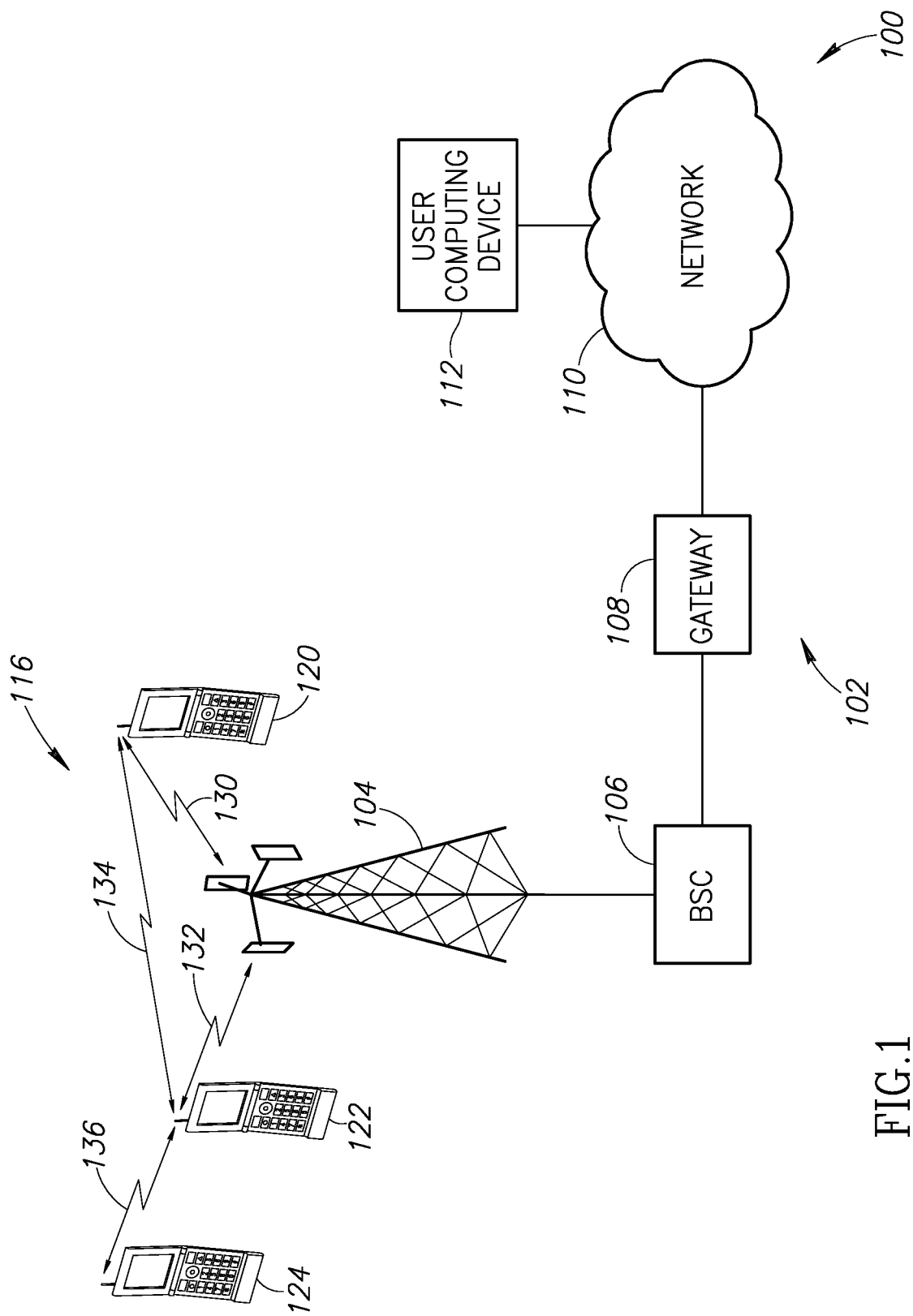
FIG. 1 is a diagram illustrating a system architecture configured to implement a communication system in accordance with the present teachings.

The wireless communication devices are illustrated as part of a system 100 illustrated in the system architecture in FIG. 1. Portions of the system 100 are conventional wireless network components that will be described briefly herein. The non-network communication capability, which may be referred to herein as a "jump-enabled" device or a "jump" device, will be described in greater detail below. A conventional wireless communication network 102 includes a base station 104. Those skilled in the art will appreciate that the typical wireless communication network 102 will include a large number of base stations 104. However, for the sake of brevity and clarity in understanding the present invention, FIG. 1 illustrates only a single base station 104.

The base station 104 is coupled to a base station controller (BSC) 106. In turn, the BSC 106 is coupled to a gateway 108. The BSC 106 may also be coupled to a mobile switching center (not shown) or other conventional wireless communication network element. The gateway 108 provides access to a network 110. The network 110 may be a private core network of the wireless communication network 102 or may be a wide area public network, such as the Internet. In FIG. 1, a user computing device 112 is illustrated as coupled to the network 110.

For the sake of brevity, a number of conventional network components of the wireless communication network are omitted. The particular network components may vary depending on the implementation of the wireless communication network 102 (e.g., CDMA vs. GSM). However, these elements are known in the art and need not be described in greater detail herein.

Also illustrated in FIG. 1 are wireless communication devices 120-124. The wireless communication devices 120-124 are illustrative of many different types of conventional wireless communication devices capable of communicating with the base station 104 or other base stations (not shown) in the wireless communication network 102. Those skilled in the art will appreciate that the wireless communication network 102 may communicate using a variety of different signaling protocols. For example, the system 100 may be successfully implemented using, by way of example, CDMA, WCDMA, GSM, UMTS, 3G, 4G, LTE, and the like. The system 100 is not limited by any specific communication protocol for the wireless communication network 102.

As illustrated in FIG. 1, the wireless communication device 120 communicates with the base station 104 via a wireless network communication link 130. Similarly, the wireless communication device 122 communicates with the base station 104 via a wireless network communication link 132. Each of the wireless communication devices illustrated in FIG. 1 (e.g., the wireless communication devices 120-124) contain a conventional transmitter/receiver or transceiver components to permit conventional communication with the wireless communication network 102 via the base station 104 or other base station (not shown). Operational details of conventional network communication are known in the art and need not be described in greater detail herein.

In addition to the conventional network transceiver components, the wireless communication devices illustrated in FIG. 1 (e.g., the wireless communication devices 120-124) also include a second short-range transceiver to allow direct communication between the devices. This short-range communication is accomplished without reliance on the wireless communication network 102. Indeed, as will be described in greater detail below, the short-range transceivers in the mobile communication devices 120-124 permit the dynamic formation of a short-range communication network 116 that does not rely on the wireless communication network 102 provided by any wireless service provider. Thus, wireless communication devices can rely on the conventional wireless communication network 102 for some communications, but may also be part of the short-range communication network 116 formed between the mobile devices themselves. In the example of FIG. 1, the wireless communication device 120 communicates with the base station 104 via the wireless network communication link 130. Similarly, the wireless communication device 122 communicates with the base station 104 via the network wireless communication link 132. However, in addition, the wireless communication devices 120 and 122 may communicate directly with each other via a short-range communication link 134.

As illustrated in FIG. 1, the wireless communication device 124 is not in communication with the wireless communication network 102. However, the wireless communication device 124 can communicate directly with the wireless communication device 122 via a short-range wireless communication link 136.

The dynamic formation of one or more short-range networks 116 allows communication between the wireless communications devices 120-124 independent of the wireless communication network 102 even if the wireless communication network 102 is present and operational. The short-range communication network 116 advantageously allows communication in settings where the wireless communication network 102 is not present or in a situation where the wireless communication network is unavailable. For example, the wireless communication network 102 may be unavailable during a power outage or an emergency situation, such as a fire, civil emergency, or the like. In contrast, the short-range communication network 116 does not rely on any infrastructure, such as cell towers, base stations, and the like. As will be described in greater detail below, the short-range communication network 116 may be extended as jump-enabled wireless communication devices move throughout a geographic location.

Figure 2:
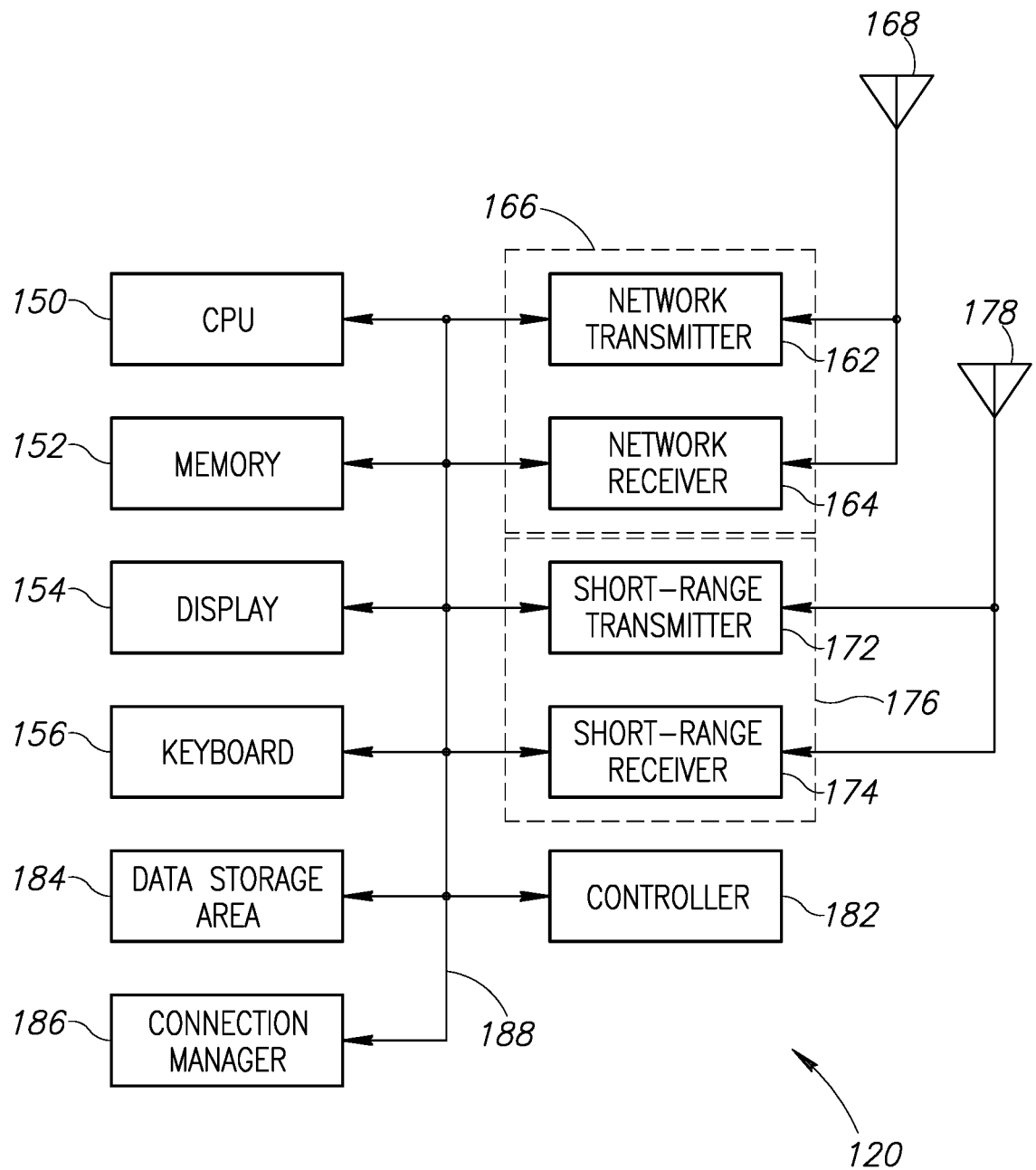
FIG. 2 is functional block diagram of one of the wireless communication devices of FIG. 1.

FIG. 2 is a functional block diagram illustrative of one of the wireless communication devices illustrated in FIG. 1 (e.g., the wireless communication device 120). The wireless communication device 120 includes a central processing unit (CPU) 150. Those skilled in the art will appreciate that the CPU 150 may be implemented as a conventional microprocessor, application specific integrated circuit (ASIC), digital signal processor (DSP), programmable gate array (PGA), or the like. The wireless communication device 120 is not limited by the specific form of the CPU 150.

The wireless communication device 120 in FIG. 2 also contains a memory 152. In general, the memory 152 stores instructions and data to control operation of the CPU 150. The memory 152 may include random access memory, ready-only memory, programmable memory, flash memory, and the like. The wireless communication device 120 is not limited by any specific form of hardware used to implement the memory 152. The memory 152 may also be integrally formed in whole or in part with the CPU 150.

The wireless communication device 120 of FIG. 2 also includes conventional components, such as a display 154 and a keypad or keyboard 156. These are conventional components that operate in a known manner and need not be described in greater detail. Other conventional components found in wireless communication devices, such as a USB interface, Bluetooth interface, camera/video device, infrared device, and the like, may also be included in the wireless communication device 120. For the sake of clarity, these conventional elements are not illustrated in the functional block diagram of FIG. 2.

The wireless communication device 120 of FIG. 2 also includes a network transmitter 162 such as may be used by the wireless communication device 120 for the conventional wireless communication network with the base station 104 (see FIG. 1). FIG. 2 also illustrates a network receiver 164 that operates in conjunction with the network transmitter 162 to communicate with the base station 104. In a typical embodiment, the network transmitter 162 and network receiver 164 share circuitry and are implemented as a network transceiver 166. The network transceiver 166 is connected to an antenna 168. The network transceiver 166 is illustrated as a generic transceiver. As previously noted, the mobile communication devices (e.g., the mobile communication devices 120-124) may be implemented in accordance with any known wireless communication protocol including, but not limited to, CDMA, WCDMA, GSM, UMTS, 3G, 4G, 5G, WiMAX, LTE, or the like. Operation of the network transceiver 166 and the antenna 168 for communication with the wireless communication network 102 is well-known in the art and need not be described in greater detail herein.

The wireless communication device 120 of FIG. 2 also includes a short-range transmitter 172 that is used by the wireless communication device 120 for direct communication with other jump-enabled wireless communication devices (e.g., the wireless communication device 122 of FIG. 1). FIG. 2 also illustrates a short-range receiver 174 that operates in conjunction with the short-range transmitter 172 to communicate directly with other jump-enabled wireless communication devices (e.g., the wireless communication device 122 of FIG. 1). In a typical embodiment, the short-range transmitter 172 and short-range receiver 174 are implemented as a short-range transceiver 176. The short-range transceiver 176 is connected to an antenna 178. In an exemplary embodiment, the antennas 168 and 178 may have common components are implemented as a single antenna.

FIG. 2 also illustrates a controller 182 and a data storage area 184. As will be described in detail below, the controller 182 controls the exchange of data between wireless communication devices that become part of the short-range communication network 116. The data storage 184 contains user profile data and messaging data that will be exchanged between wireless communication devices in the short-range communication network 116. The data storage area 184 may be implemented as any convenient data structure. As will be described in greater detail below, the data storage area 184 contains data (e.g., messages, personal profile information of contacts, a geographical location tag for each contact, and the like) that will be exchanged between wireless communication devices. The data may be stored as a simple list, part of a database, or any other convenient data storage structure. The user profile can include a broad array of information such as user name, nickname, age, sex, education and work background, hobbies, food preferences (love sushi, Hunan, and Mediterranean food, etc.), and the like. In one embodiment, described in U.S. application Ser. No. 12/397,225, filed on Mar. 3, 2009, now U.S. Pat. No. 7,970,351, two wireless devices may exchange portions of user profile data to determine whether there is a suitable match between the users. If the phones determine that there is a suitable match based on the user profiles, an alert signal may be generated to indicate to the individual users that there is a person nearby that they should meet. In another embodiment, user profile data may be used in a business venue to determine appropriate marketing and advertisement data based on the user profile.

In addition, wireless communication device 120 of FIG. 2 also includes a connection manager 186, which may be implemented as an application program or an application programming interface (API). Those skilled in the art will appreciate that operation of an application program is typically initiated by a user of the device while an API becomes part of the operating system and is always running. In an exemplary embodiment, the connection manager 186 configures the controller 182 to search for and automatically without human intervention connect with selected APs, such the AP 140 in FIG. 3 or an LTE/NR compatible radio 448 in FIGS. 6 and 8, and the modem/router 560 in FIG. 12. The term "NR" refers to a "New Radio," which is a 5G compatible device. Also, as used herein, the term "AP" refers to an access point, which refers generically to a device with which mobile communication devices can communicate using either WiFi technology or with LTE/NR technology. The AP can include either a WiFi compatible radio, a LTE/NR compatible radio, or both radios. In some embodiments, the AP radio may be programmable and can switch functionality from a WiFi compatible radio to a LTE/NR compatible radio.

The connection manager 186 may also designate primary and secondary APs where connection with a primary AP is preferable and connection to a secondary AP is performed if a primary AP is not available. The software implementing the connection manager 186 can be loaded into the wireless communication device 120 by a number of alternative techniques. In one implementation, the API can be installed by the manufacturer at the time of manufacture or loaded onto the wireless communication device by the carrier. Alternatively, the connection manager 186 may be downloaded as an application from an application store hosted by the device manufacturer, wireless service provider, or the like.

The various components illustrated in FIG. 2 are coupled together by a bus system 188. The bus system may include an address bus, data bus, power bus, control bus, and the like. For the sake of convenience, the various busses in FIG. 2 are illustrated as the bus system 188.

In one embodiment, when the jump-enabled wireless communication device 120 comes within range of any other jump-enabled wireless communication device (e.g., the wireless communication device 122 of FIG. 1), it establishes a short-range wireless communication link (e.g., the short-range wireless communication link 134).

In an exemplary embodiment, the short-range transceiver 176 may be designed for operation in accordance with IEEE standard 802.11, sometimes referred to as WiFi. Many modern wireless communication devices are equipped with WiFi and may be readily upgraded to support the functionality described herein. Because the wireless communication devices 120-124 all include WiFi capability, short-range communication networks 116 may be formed even though the wireless communication devices may be designed to operate with incompatible wireless communication networks 102. For example, the wireless communication device 122 may be configured for operation with a GSM implementation of the wireless communication network 102. The wireless communication device 124 may be configured for operation with a CDMA implementation of a wireless communication network 102. Even though the wireless communication devices 122-124 are incompatible with respect to the respective wireless communication networks 102, the wireless communication devices 122-124 may still communicate directly with each other via the short-range communication network 116. Thus, the wireless communication devices 120-124 may operate compatibly to form the short-range communication networks 116 even though the network transceivers 166 (see FIG. 2) may operate with different incompatible wireless communication networks 102.

Various techniques for establishing the short-range communication network 116 (see FIG. 1) are described in U.S. application Ser. No. 12/397,225 filed on Mar. 3, 2009, now U.S. Pat. No. 7,970,351, U.S. application Ser. No. 12/616, 958 filed on Nov. 12, 2009, now U.S. Pat. No. 8,190,119, U.S. application Ser. No. 12/958,296, filed on Dec. 1, 2010, and U.S. application Ser. No. 13/093,988 filed on Apr. 26, 2011, now U.S. Pat. No. 8,995,923, the entire disclosures and content of which are hereby incorporated by reference in their entirety.

As will be discussed in greater detail below, the system 100 goes beyond some of the conventional operation of WiFi standards to permit a large number of wireless communication devices to communicate directly with each other. In one embodiment, a local hot spot is used to initiate the formation of the short-range communication network 116. Once established, the short-range communication network 116 may continue to exist even if the hot spot (or group owner) is no longer present. In yet another alternative embodiment, described below, the wireless communication devices may be pre-programmed to utilize a common SSID, IP range, and port to spontaneously form a short-range communication network 116 even in the absence of any hot spot.

In an exemplary embodiment of the system 100, each wireless communication device (e.g., the wireless communication devices 120-124) transmits a beacon signal with the same SSID, such as the SSID "JUMMMP" to identify the device as a jump-enabled wireless communication device. In addition, the beacon frame includes several other data fields such as a media access layer (MAC) address for source and destination. In the beacon frame, the destination MAC address is set to all ones to force other wireless communication devices to receive and process the beacon frame. The beacon frame used in the system 100 may also include conventional elements, such as a time stamp used for synchronization with other wireless devices, information on supported data rates, parameter sets that indicate, for example, transceiver operational parameters such as the IEEE 802.11 channel number and signaling method such as operation at the physical layer (PHY) and operation in a direct frequency spectrum (DSSS) or a frequency hopping spread spectrum (FHSS) operational modes. These conventional WiFi parameters are known in the art and need not be described in greater detail herein.

In addition, since there is no access point, all jump-enabled wireless communication devices take on the responsibilities of the MAC layer that controls, manages, and maintains the communication between the jump-enabled wireless communication devices by coordinating access to the shared radio channel and the protocols that operate over the wireless medium. In an exemplary embodiment, the MAC is implemented in accordance with IEEE 802.2. At the PHY layer, the transceiver may operate in a DSSS or a FHSS operational mode. Alternatively, the PHY layer may be implemented using infrared transceivers. The IEEE 802.11 standard defines a common operation whether devices are using the ad hoc or the infrastructure mode. The use of the ad hoc mode only affects protocols, so there is no impact on the PHY layer. Thus, the wireless communication device 120 may operate under IEEE 802.11ac/ax at 5 gigahertz (GHz) under IEEE 802.11b/g at 2.4 GHz, or IEEE 802.11n, which operates at both 2.4 GHz and 5 GHz. Those skilled in the art will appreciate that the wireless communication device of the system 100 may be readily adapted for operation with future versions of IEEE 802.11.

In an alternative embodiment, the wireless communication devices 120-124 may be configured in accordance with IEEE WiFi Direct standards. WiFi Direct allows any wireless communication device in the short-range communication network 116 to function as the group owner. WiFi Direct simplifies the process of establishing a communication link. For example, the WiFi protected set up allows a communication link to be established by entering a PIN or other identification or, simply pressing a button. As will be described herein, the jump-enabled wireless communication devices actively seek to establish links with other jump-enabled devices to automatically establish a short-range communication network 116.

Figure 3:
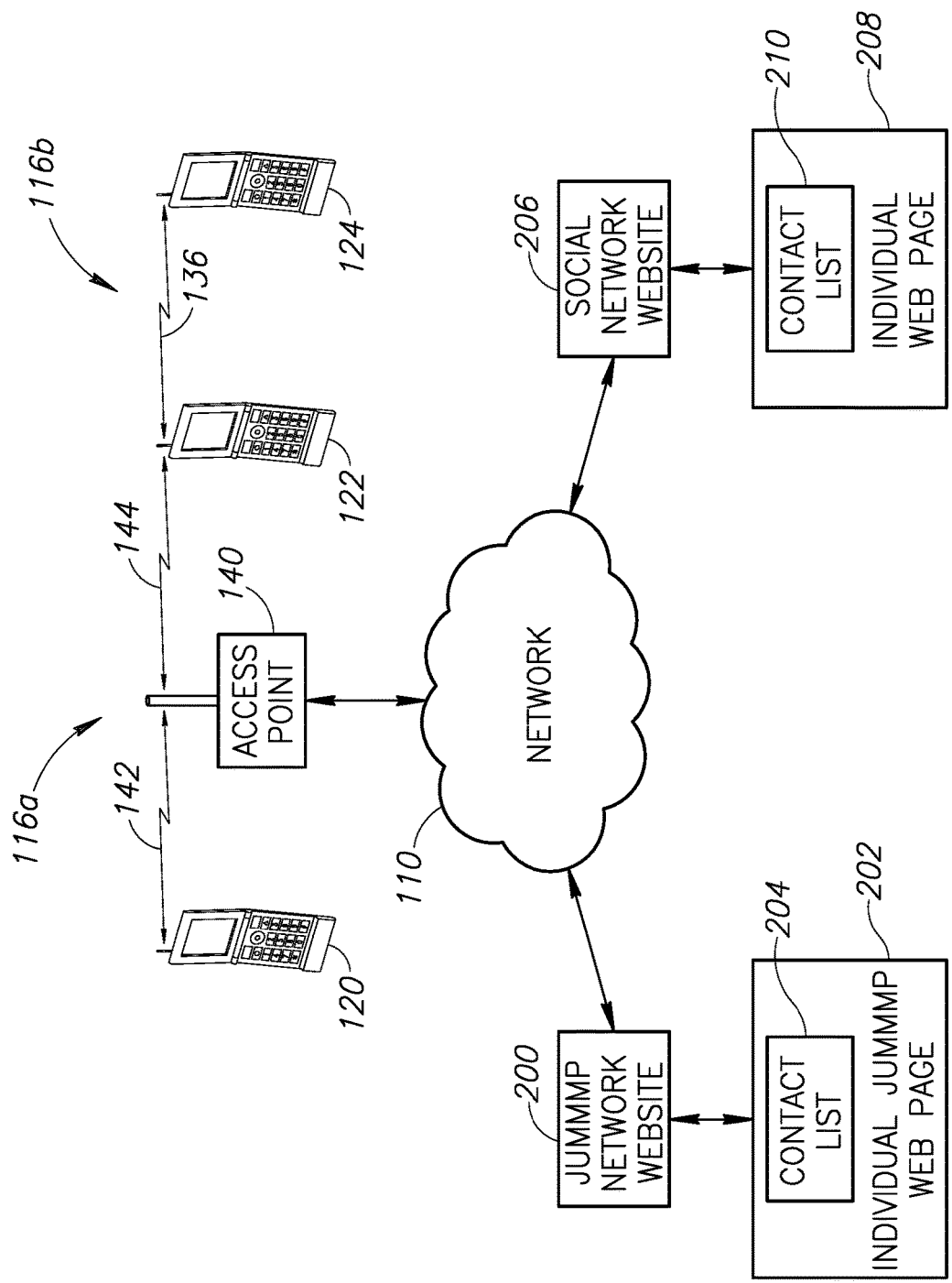
FIG. 3 illustrates an embodiment of the system of FIG. 1 using an access point as part of a network.

In yet another alternative embodiment, illustrated in FIG. 3, the jump-enabled wireless communication devices (e.g., the wireless communication devices 120-122) may communicate with an access point 140, such as a WiFi base station, WAP, wireless router, or the like. As will be described in greater detail below, a wireless communication device (e.g., one of the wireless communication devices 120-124) may function as the access point 140 to permit others of the wireless communication devices in the short range communication network 116 to access the network 110 via the wireless communication device serving as the access point. FIG. 3 illustrates a wireless communication link 142 established between the access point 140 and the wireless communication device 120. Similarly, the wireless communication device 122 establishes a wireless communication link 144 with the access point 140. Thus, a short-range communication network 116a is formed in conjunction with the access point 140. To assist in a better understanding of the present disclosure, short-range communication networks will be generally referred to by the reference 116. Specific examples of short-range communication networks will be referred to by the reference 116 and an alphabetic identifier (e.g., the short-range communication network 116a in FIG. 3).

Depending on the physical proximity of the wireless communication devices 120-124, there may be one or more short-range communication networks 116 formed. In the example of FIG. 3, the wireless communication devices 120-122 are both within range of the access point 140. Therefore, the first short-range communication network 116a can be formed with the wireless communication devices 120-122 and the access point 140.

The wireless communication device 124 is within range of the wireless communication device 122, but is not within range of the access point 140. In one embodiment, the wireless communication device 124 may be become part of the short-range communication network 116a via the wireless communication device 122. In this embodiment, the wireless communication device 122 functions as a "repeater" or relay to relay information between the wireless communication device 124 and other parts of the short-range communication network 116a. In another embodiment, a second short-range communication network 116b is formed with the wireless communication devices 122-124. In this exemplary embodiment, the wireless communication device 122 is part of both short-range communication networks 116a-116b. The wireless communication device 122 may simultaneously be a member of both short-range communication networks 116a-116b or may be logically connected to both short-range communication networks 116a-116b by alternately switching between the short-range communication networks 116a-116b.

The access point 140 is coupled to the network 110 in a conventional manner. This can include a wired or wireless connection directly to the network 110 or via an intermediate network gateway, such as those provided by an Internet Service Provider (ISP). FIG. 3 also illustrates a JUMMMP Network website 200, which may support an individual web page 202 for each member (e.g., an individual person, business, organization, etc.) of the JUMMMP Network. FIG. 3 also illustrates a generic conventional social network website 206, which may support an individual web page 208 for each member of the social network. The JUMMMP network website 200 and social network website 206 are each coupled to the network 110. Although illustrated in FIG. 3 as two separate network websites, those skilled in the art will appreciate that the JUMMMP website 200 effectively functions as a social network website. Similarly, the JUMMMP website technology can be incorporated into existing social network websites. Thus, the two separate websites illustrated in FIG. 3 can effectively be combined into a single website.

As discussed in detail in co-pending U.S. application Ser. No. 12/616,958, filed on Nov. 12, 2009 and assigned to the assignee of the present application, the user of a jump-enabled wireless communication device (e.g., the wireless device 120) may use the web-browsing capability of the wireless communication device to access the individual jump web page 202 for the individual with whom contact has just been made to learn more about that individual. Alternatively, the user of a jump-enabled wireless communication device (e.g., the wireless device 120) may use the web-browsing capability of the wireless communication device to access the user's own individual jump web page 202 to store information for the individual with whom contact has just been made. A contact list 204, which is typically a portion of the individual jump web page 202 is configured to store contact information. Similarly, the individual jump web page 208 of the social network 206 can include a contact list 210 to store contact information. In one embodiment, the contact information may include a user profile exchanged along with individual messages between users. As will be discussed in greater detail below, the user profile can include user name and preferences, as well as information about the specific exchange of messages. For example, the user profile can include the date and time at which messages were exchanged, geo-location data (e.g., latitude and longitude) of the sender of a message, and the like, and can also be stored as user profile data in the contact list 204. Applications for the profile data are described in greater detail below.

In an alternative embodiment, access to the network 110 may be provided via another jump-enabled wireless communication device. For example, in FIG. 1, the wireless communication device 122 can communicate with the base station 104 via the wireless communication link 132 while the wireless communication device 124 cannot communicate directly with the base station. However, the wireless communication device 124 is in proximity with the wireless communication device 122 and can communicate with the wireless communication device 122 via the wireless communication link 136 as part of the short-range communication network 116. In this embodiment, the wireless communication device 124 can use the wireless communication device 122 as a repeater or relay to allow the wireless communication device 122 to access the network 110 via the wireless communication device 122 and the base station 104.

Similarly, in the embodiment of FIG. 3, the wireless communication devices 120-122 can communicate directly with the access point 140 via the wireless communication links 142-144, respectively. The wireless communication devices 120-122 can also communicate with each other via the access point 140 thus forming the short-range communication network 116a. As seen in FIG. 3, the wireless communication device 124 cannot communicate directly with the access point 140. However, the wireless communication device 124 is in proximity with the wireless communication device 122 and can communicate with the network 110 via the wireless communication device 122 and the access point 140.

Figure 4:
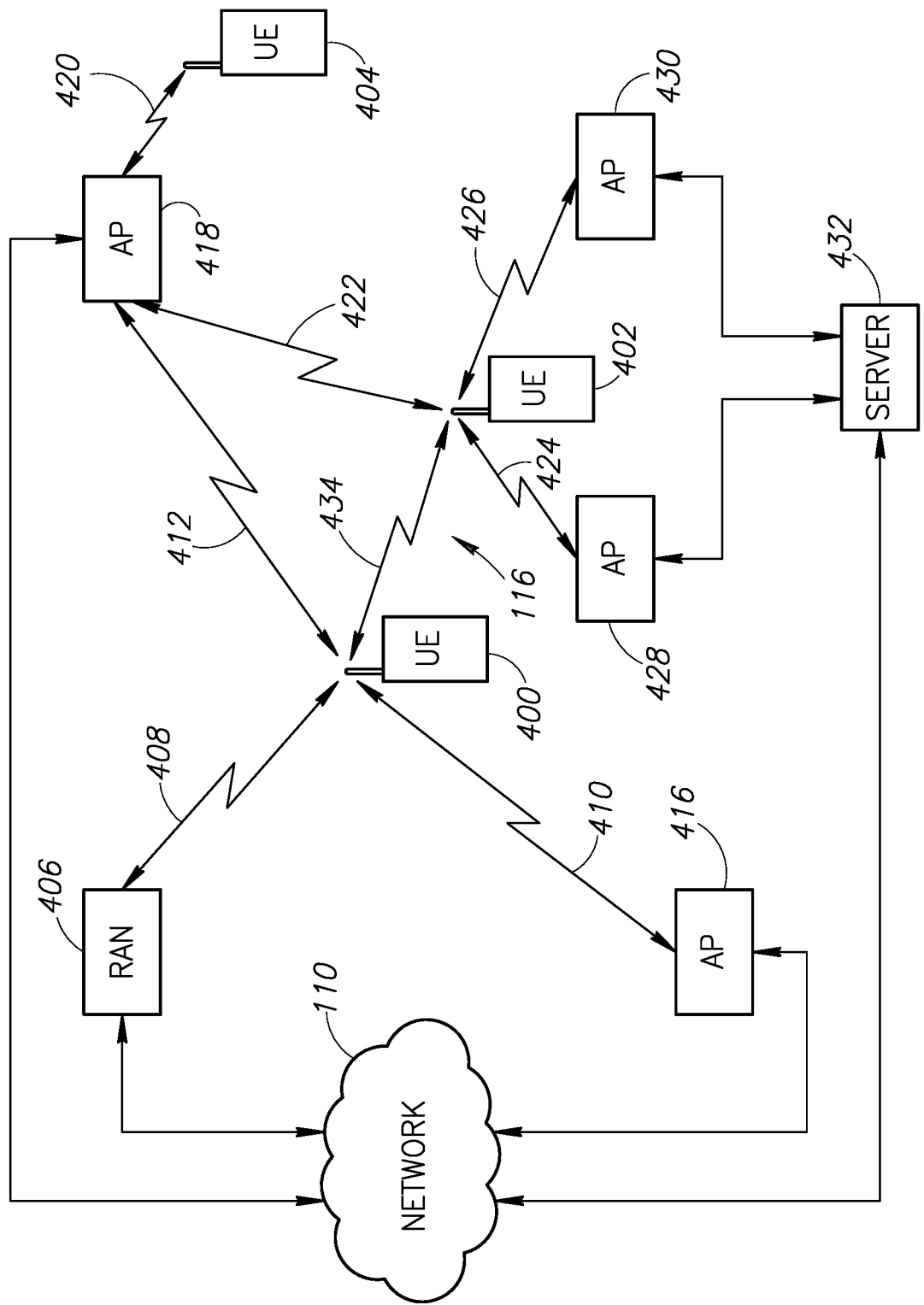
FIG. 4 is an example network architecture of a dynamic network illustrating communication between user equipment, wireless access points, and a wireless service provider network.
Figure 5:
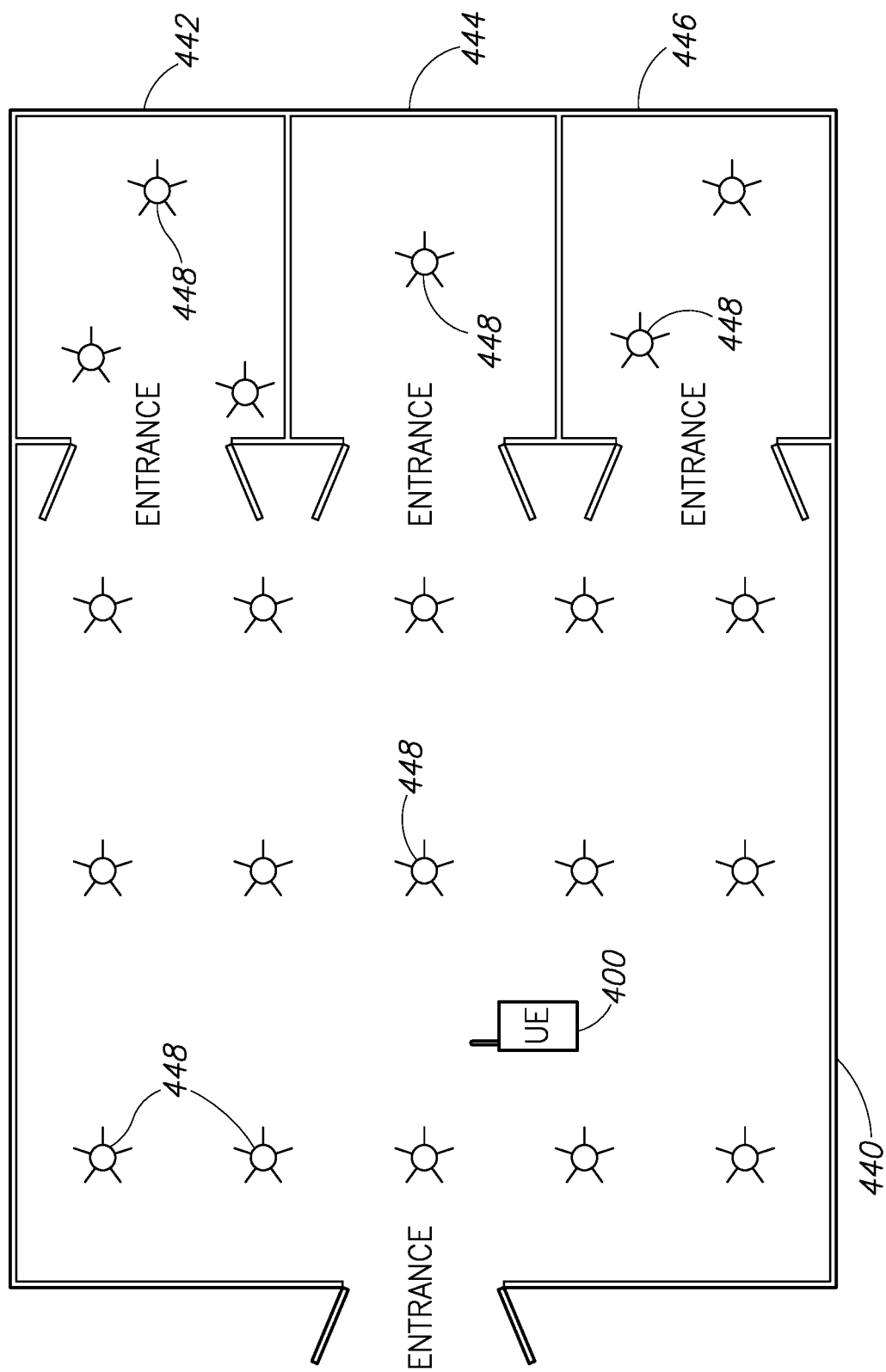
FIG. 5 illustrates a venue with a large number of distributed wireless access points.
Figure 6:
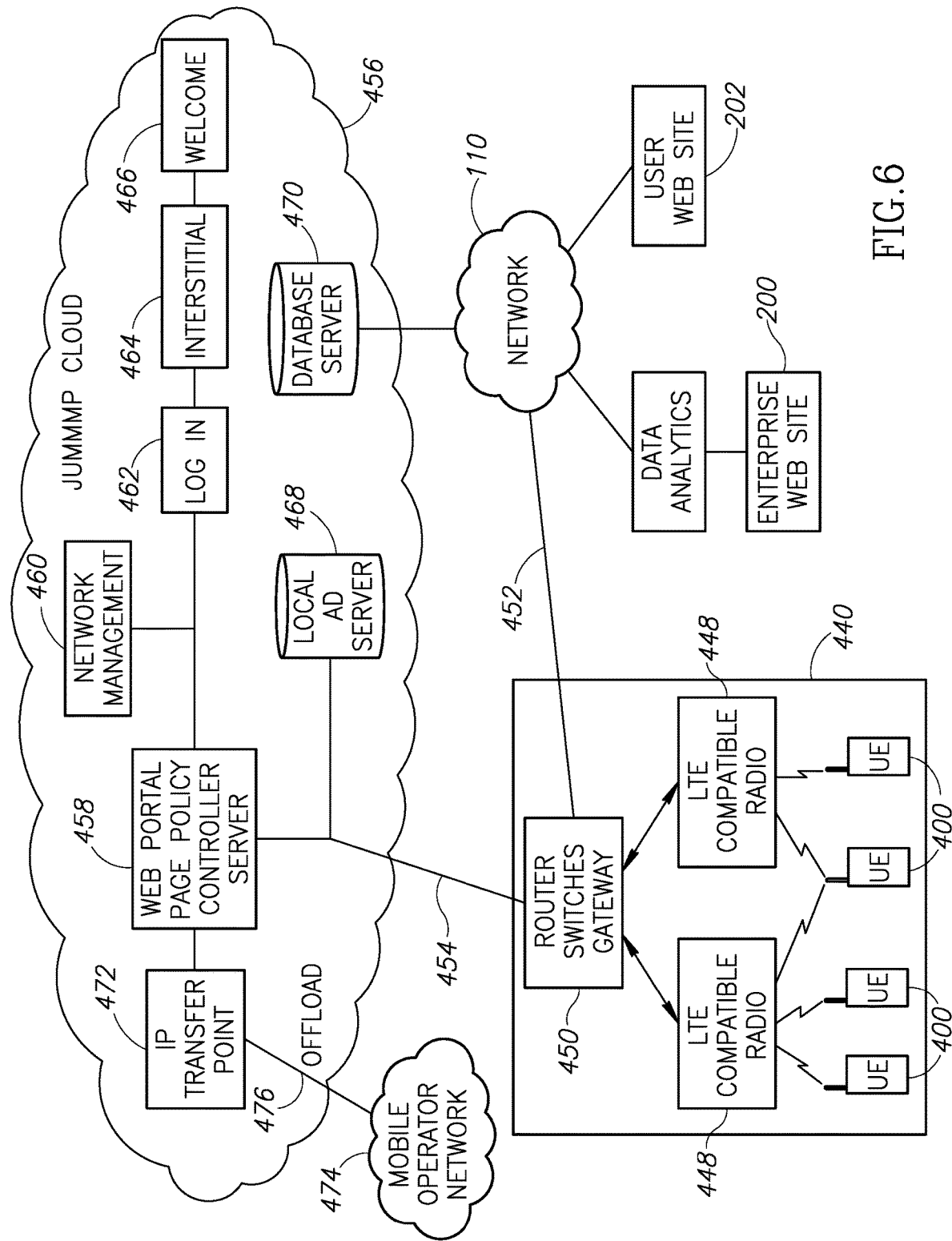
FIG. 6 illustrates a system architecture in which a venue communicates with a Cloud network.

In another example application of the system 100, a business may utilize the short-range communication networks 116 to disseminate business information in the form of messages, coupons, advertisements, and the like. In addition, a wireless communication device may communicate with multiple vendors within a particular venue and receive information that varies from one venue to another. This is illustrated in FIGS. 4-6. In FIG. 4, wireless communication devices are referred to generically as user equipment (UE). The term UE is intended to include any wireless communication device capable of processing audio, video, and text messaging. This includes smart phones, laptops, PDAs, computer tablets (e.g., an iPad™), and the like.

FIG. 4 illustrates UEs 400-404 in a venue such as a shopping mall. The UE 400 uses the network transceiver 166 (see FIG. 2) to communicate with a radio access network (RAN) 406. The RAN 406 is intended to generically represent a base station (e.g., the base station 104 in FIG. 1) and any associated support circuitry. The UE 400 establishes a wireless communication link 408 with the RAN 406 in a conventional manner.

FIG. 4 also illustrates wireless communication links 410-412 coupling the UE 400 with APs 416-418, respectively. In a typical shopping mall setting, the APs 416-418 may typically be associated with different stores in the shopping mall. FIG. 4 also illustrates the UE 404 communicating with the AP 418 via the wireless communication link 420. The UE 402 also communicates with the AP 418 via a wireless communication link 422. In FIG. 4, the UE 402 establishes wireless communication links 424-426 with APs 428-430, respectively. In the example of FIG. 4, the AP 428 and the AP 430 may be co-located in the same store and are coupled to a server 432. In this embodiment, the two APs 428-430 form a network back bone that creates a tether for multiple phones within the store in which the APs are located. As the customer moves throughout the store, the UE 402 will connect to the AP 428 or the AP 430 depending on the signal strength. If other UEs come within range of the APs 428-430, the UEs may communicate for the all the purposes described above either directly or via the WiFi AP mesh network formed by the APs 428-430.

As will be described in greater detail below, the server 432 may control the flow of data to and from the UE 402 via the AP 428 and/or the AP 430. Those skilled in the art will appreciate that the APs (e.g., the AP 416) can be implemented in a variety of fashions. In one embodiment, the AP 416 may be directly coupled to a service provider. For example, the AP 416 may be implemented as a cable modem with a wireless connectivity for the UE 400. In another embodiment, the AP 416 may be coupled to a computer (not shown) which controls operation of the AP 416 as well as controlling communications with the network 110. In this embodiment, the network 110 may be a wide area network, such as the internet.

In addition to the various wireless communication links between the UE 400 and the RAN 406 and/or the AP 416-418, the UE 400 can establish a wireless communication link 434 with the UE 402. The wireless communication link 434 is established using the short-range transceiver 176 (see FIG. 2) thus permitting the UE 400 and 402 to establish the short-range communication network 116. The short-range communication network 116 in FIG. 4 operates in a manner described above.

In the example of FIG. 4, the AP 416 and AP 418 may be access points for different businesses. As the UE 400 moves within range of the AP 416, the wireless communication link 410 is established and the AP 416 may disseminate business information, such as messages, coupons, advertisements, and the like. Similarly, when the UE 400 moves within range of the AP 418, the wireless communication link 412 is established and the UE 400 may receive business information from the AP 418. In the example of FIG. 4, some or all of the information received from the AP 416 via the wireless communication link 410 may be relayed from the UE 400 to the UE 402 via the wireless communication link 434. Thus, information from the business associated with the AP 416 may be disseminated to other UEs (the UE 402 in FIG. 4) via the short range communication network 116. As discussed above, a wireless communication device (e.g. the wireless communication device 122 in FIG. 1) may serve as a hot spot in a short-range communication network 116. However, in some settings, such as the shopping mall example illustrated in FIG. 4, there is generally sufficient coverage provided by the APs spread throughout the shopping mall. Thus, the short-range communication networks may typically be established using an AP, such as the AP 140 in FIG. 3 or any of the APs shown in FIG. 4. As will be discussed in greater detail below, a verification system can be used to assure the authenticity of the information received by the UE 400 from the AP 416 and the AP 418.

In FIG. 4, the UE 402 has established wireless communication links 424-426 with the APs 428-430, respectively. As noted above, these APs may be in a large business. As the user moves from one department to another or from one store level to another, he may move in or out of range of one AP or the other. Thus, the information provided to the UE 402 may be customized for the user based on the user's current location within the business.

FIG. 5 illustrates a large venue 440, such as a casino. In such a large venue, there may be related businesses 442-446 located within or near the venue 440. In the casino example, the related business 442 may be a performance venue for singers, comedy acts, and the like. The related business 444 may be a nightclub while the related business 446 may be a restaurant.

Due to the large size of the venue 440, it may be necessary to deploy a network of APs, illustrated by the reference number 448. The position and coverage area of the APs 448 can be determined based on the particular hardware implementation. The actual distribution and installation of the APs 448 within the venue 440 is within the engineering knowledge of one skilled in the art and need not be described in greater detail herein.

In the embodiment of FIG. 5, all of the APs 448 may be coupled to a server (e.g., the server 432 in FIG. 4) or a gateway 450 (see FIG. 6). As the UE 400 moves throughout the venue 440, it is making and breaking wireless communication devices with one or more of the APs 448. The identity of the UE 400 can be verified by the UE providing a profile and user information and signing up for the WiFi service and downloading the API in exchange for free WiFi service. Initially this may be accomplished through a portal page, as will be described in greater detail below.

Once the identity of the UE 400 has been verified, the server 432 can provide customized messages to the owner of the UE 400. While the UE 400 remains within the venue 440, it is in substantially continuous contact with the APs 448 and may receive data therefrom. For example, the UE 400 could receive an ad for free or discounted tickets to the performance venue 442 or an invitation to happy hour at the nightclub venue 444 or a discounted meal at the restaurant venue 446. If the owner of a UE 400 is not a registered guest at a hotel within the venue 440, the APs 448 could send an invitation or ad to book a room in the venue 440. The UE 400 can communicate with the server 432 via the APs 448 to accept one or more of the ad offers. For example, the UE 400 could transmit an acceptance and book tickets at the performance venue 442. Similarly, the user of the UE 400 can book a room in the venue 440.

The venue 440 can establish virtually continuous wireless communication links with the UE 400 and provide a stream of ad content (e.g., ads, offers, discounts, etc.) for the venue 440 and the related businesses 442-446. Thus, the stream of ad data to the UE 400 may be for the venue 440 and the related businesses 442-446. Alternatively, the venue 440 may provide advertising for a different venue (not shown). For example, if the venue 440 is a casino in a large city, such as Las Vegas, the server 432 may provide ad content for a related business down the street or even for a third-party business with whom the venue 440 has contracted to provide advertising to the UE 400. For example, the AP 448 may provide advertising for a convention at a different venue or for a boxing match at a different venue. Thus, advertising content may or may not be related to the venue 440 in which the UE 400 is presently located.

FIG. 6 illustrates a system architecture that allows operation of the system across multiple venues. In FIG. 5, the venue 440 is illustrated with a limited number of UEs 400 and a limited number of APs 448. As discussed above with respect to FIG. 5, the venue 440 may have a large number of APs 448 distributed throughout the venue.

In one embodiment, the APs 448 are configured for operation in accordance with IEEE 802.11, sometimes referred to as WiFi. Virtually all UEs 400 have WiFi capability and thus have virtually universal connectivity. In another embodiment, the mobile operator network 474 is a 5G wireless network, which has significantly increased data rates compared with earlier technologies, such as 3G and 4G. Rather than provide WiFi compatible APs 448 in a venue, the functionality of the APs has been supplemented by LTE/NR compatible radios 448 shown in FIGS. 6 and 8.

In one embodiment, the AP can include both WiFi compatible radios in addition to the LTE/NR compatible radios 448 are able to provide both WiFi functionality and LTE functionality. As will be discussed in greater detail below, the UE 400 can connect to the LTE/NR compatible radios 448 with the network transceiver 166 (see FIG. 2) or connect to the WiFi compatible radios with the short-range transceiver 176.

The various LTE/NR compatible radios 448 are coupled together using infra-structure such as routers, switches, and the like. Those routers, switches and gateways are illustrated in FIG. 6 by the reference 450. The routers, switches and gateways 450 can be implemented as Evolved Packet Core (EPC) equipment, which can transport both WiFi and LTE traffic.

Among other things, the gateway 450 allows an interconnection to the network 110 via a communication link 452, but could be any wide area network. In a typical embodiment, the network 110 may be implemented as the Internet. In addition to the communication link 452, the gateway 450 provides a backhaul 454 to a cloud computing environment designated as a JUMMMP Cloud 456. The backhaul 454 may be implemented in a variety of different manners using known technology. In one embodiment, the backhaul 454 may be routed to the JUMMMP Cloud 456 via the network 110.

Within the JUMMMP Cloud 456 are a number of components. A web portal page and policy controller server 458 controls user authentication across a number of different venues in addition to the venue 440. A network management element 460 controls overall operation of the network in the JUMMMP Cloud 456. In one implementation, the policy server controller 458 can also include SaMOG-GW (S2a mobility over GTP) functionality. GTP refers to a general packet radio service (GPRS) tunneling protocol for use with 3G/4G networks. The infrastructure 450 provides tunneling to the policy server controller 458 via the backhaul 454 or an internet connection. This component provides EPC integration to a mobile operator network by acting as a trusted wireless gateway (TWAG). This permits seamless transition between 3G/4G/LTE and 802.11 radios as the UE 400 session state is maintained during roaming. Accounting for UE 400 traffic can then be broken down by mobile operator services (e.g., WiFi calling) and standard internet based traffic. Those skilled in the art will appreciate that SaMOG-GW can be incorporated into other system architectures, such as those illustrated in the sample embodiments of FIGS. 8 and 12.

As will be discussed in greater detail below, mobile service providers can implement differential service charges to customers for various services. For example, WiFi calling may be billed to a customer at one rate while video conferencing or other services can be provided to customers at a different rate.

FIG. 6 illustrates a number of different web pages that may be downloaded to the UE 400 in the venue 440. In one embodiment, the venue 440 may include its own server and store its own portal pages. However, such an architecture requires that each venue have a separate server to support this functionality. The system in FIG. 6 advantageously utilizes the web portal page server and policy controller server 458 for multiple venues. The JUMMMP Cloud 456 may have some common pages for all venues, such as a log-in web page 462. However, even the log-in web page may be unique to the venue 440.

In addition to the log-in web page 462, the JUMMMP Cloud 456 may have one or more interstitial web pages 464. For example, interstitial web pages may display information about the venue 440 (or advertising for businesses within the venue, third party advertising, or advertising for other venues within the JUMMMP network) while the user is waiting for completion of the registration verification process. In addition, the JUMMMP Cloud 456 may include one or more welcome web pages 466. The welcome web pages 466 may offer various services, such as a credit card data entry page, and Internet access sign-up page, a voucher code entry page to permit the user to enter discount voucher data, and the like. For example, the initial registration can provide WiFi connectivity at a certain service level, such as a basic bandwidth. However, the welcome pages may include an offer to upgrade WiFi connectivity to a higher bandwidth for an advertised price. If the user is a guest at the venue 440, the charge can be automatically made to the user's room. In another embodiment, the user's phone may be charged for the upgraded bandwidth service. Other similar services may be provided in the welcome web pages 466.

One skilled in the art will appreciate that the interstitial web pages 464 and the welcome web pages 466 may be unique to the venue 440. Even though these web pages may be unique to the venue, the centralized web portal page server 458 within the JUMMMP Cloud 456 simplifies the overall system architecture within the venue 440 and within other venues by eliminating the need for a portal page server within each venue.

A local ad server 468 in the JUMMMP Cloud 456 may provide localized ads for multiple venues, including the venue 440. As discussed above, the ads may be for the venue 440 itself or for the related businesses 442-446 (see FIG. 5). In addition, the ads may be for businesses near the venue 440 (or for other venues in the JUMMMP network). The ad server 468 in the JUMMMP Cloud 456 simplifies the network architecture within the venue 440 and other venues by eliminating the need for an ad server within each venue.

A data base server 470 in the JUMMMP Cloud 456 may be configured to collect a broad range of information regarding the UEs 400 (including the user profile information from the data storage area 184 (see FIG. 2) that was provided when the UE 400 was first identified in the venue. The profile information will help provide targeting marketing and advertising to the UE 400 as it traverses the venue). As previously discussed, data messages may include geo-location data. The geo-location data (e.g., longitude and latitude) can be obtained in several possible ways. In one embodiment, the wireless communication device (e.g., the UE 400 in FIG. 6) may have built-in GPS. Other possible location determination technologies include WiFi, 3G, approximation triangulation, or last-known location of the user. Other known location technologies may also be implemented in the system 100. For example, the UE 400 will communicate with different ones of the access point 448 in the venue 440 shown in FIG. 5. As the UE 400 moves throughout the venue, new communication links are established with nearby access points 448. By identifying which access point 448 the UE 400 is communicating with, it is possible to determine the location of the UE 400 with a reasonable degree of accuracy. The database server 470 is configured to store location information, along with time/date data to thereby track movements of the UE 400. In one embodiment, the database server 470 can also be configured to store message data from the UEs 400 throughout the system 100. In yet another embodiment, the database server 470 may also store user profiles for the UE 400 as well as profile data collected by the UE 400 from other JUMMMP users. In one configuration, the API, which is installed on the UE 400 as part of the initial registration process prior to entering the venue 400 or as part of the verification process when the UE enters the venue 400, is configured to generate a "heartbeat" signal that periodically reports location data back to the database server 470. The location data may include a time/date stamp to provide location information for the UE 400. This information can be useful for marketing purposes. Using the example of FIG. 5, where the casino venue 440 includes a large area as well as related businesses 442-446, the database server 470 can determine how long the UE 400 remains in a particular area (e.g., one area of the casino), how many times and how long the UE remains at the bar, in a nightclub or the like. By collecting this information, the database server 470 can establish a user profile for the UE 400 for marketing purposes.

The JUMMMP Cloud 456 also includes an IP transfer point 472, which is coupled to a mobile operator network 474 via a communication link 476. As those skilled in the art will appreciate, mobile data off-loading, also called data off-loading, involves the use of complementary network technologies for delivering data originally targeted for cellular networks, such as the mobile operator network 474. In areas where the cellular network traffic is heavy, network congestion may occur. To reduce congestion, mobile network operators sometimes set up WiFi access points in areas of congestion and allow some of the data originally targeted for the mobile operator network 474 to be carried by the WiFi network. Rules triggering the mobile off-loading action can be set by an end user (i.e., the mobile subscriber) or the mobile network operator. The software code operating on the off-loading rules can reside in the UE 400, in a server, or divided between these two devices. For the end users, the purpose of mobile data off-loading may be based on the cost for data service and the availability of higher bandwidth. For mobile network operators, off-loading can reduce congestion of the cellular network and improve coverage in areas such as building interiors. The primary complementary network technologies used for mobile data off-loading are WiFi, femtocells, and integrated mobile broadcast.

In a typical embodiment, each mobile network operator has its own WiFi network to off-load data that would otherwise be carried on its particular mobile operator network. In the context of FIG. 6, the LTE/NR compatible radios 448 within the venue 440 do not belong to the operator of the mobile operator network 474 as is normally the case in data off-loading. In the implementation described in the present disclosure, the data off-loading is provided by the venue 440 through contract with the mobile operator network 474. Although FIG. 6 illustrates only a single mobile operator network 474, those skilled in the art will appreciate that it is representative of one or more mobile operator networks. In operation, each mobile operator network contracts with the venue 440, either directly or with the JUMMMP Cloud 456, to provide data off-loading in the venue. When the UE 400 enters the venue, the mobile network operator is notified and the mobile operator network 474 can determine whether or not to off-load data traffic for that UE. If data off-loading for the UE is approved in accordance with the rules described above, Internet access, text messaging, and even telephone calls can be provided to the UE 400 via a connection from the mobile operator network 474 through the communication link 476 to the IP transfer point 472 within the JUMMMP Cloud 456. In turn, that off-loaded data is routed through the backhaul 454 to an AP 448 and ultimately to the UE 400. Similarly, outgoing calls and data uploads from the UE 400 may be routed in the reverse fashion. This approach has the beneficial effect of off-loading traffic from an otherwise congested mobile operator network 474. In addition, the mobile network operator may find improved performance because direct communication with the UE 400 through a base station (e.g., the base station 104 in FIG. 1) may not work well when the UE 400 is inside a building, such as the venue 440. Thus, improved reception and reduction in network congestion are double benefits of the IP off-loading provided by the JUMMMP Cloud 456.

The present disclosure provides a mechanism for tracking data utilization for any UEs 400 that are sending or receiving off-loaded data traffic. As will be described in greater detail below, this tracking mechanism permits the mobile operator network 474 to monetize the off-loaded traffic by measuring and categorizing data usage (i.e., unlimited data downloads, pre-paid charged, or post-paid charges). As described above, the data off-loading can ease the traffic burden over the existing mobile operator network 474 and reduce roaming charges to the end user.

As noted above, the policy server controller 458 controls the authentication process across multiple venues. In the embodiment of FIG. 6, the policy server controller 458 may also function as a registration server to assure the authentication of the UE 400. Those skilled in the art will appreciate that the components shown in the JUMMMP Cloud 456 are illustrated as individual elements. In one embodiment, a single policy controller server 458 may be sufficient for a large area, such as the entire country. Indeed, in one embodiments, a single policy controller server 458 may provide registration services for the entire system 100. However, those skilled in the art will appreciate that the policy controller server 458 may be illustrative of a number of different computing platforms designed to implement the functionality of the policy controller server. In one embodiment there may be a policy controller server for large cities, individual states, regions of the country, or an entire country. In another embodiment, the policy controller server 458 may be implemented in a hierarchical fashion where a local or regional policy server controller 458 contains local and regional data, but may communicate with regional or national policy controller servers 458 on a higher hierarchical level. For example, if the UE 400 performs an initial registration in one city, that registration data may be stored in a local implementation of the policy controller server 458 and reported to a regional or national level of the policy controller server. In this manner, the registration data may be efficiently distributed throughout a wide area. As will be discussed in detail below, this arrangement also facilitates easy subsequent authentication of the UE 400.

The UE 400 must register with the system 100 at some initial point in time. The initial registration can be performed remotely using, by way of example, a laptop or PC connected to the JUMMMP Cloud 456 via the network 110. In another variation, the UE can perform an initial registration as it enters the venue 440 illustrated in FIG. 6. When the UE 400 initially contacts one of the APs 448 in the venue, the policy controller server 458 will not have any data related to that particular UE 400. In this case, that initial AP 448 in the venue 440 may perform an initial registration. For the initial registration, the UE 400 can connect to the initial AP 448 and provide identification information. In an exemplary embodiment, the user can complete the initial registration process by providing data, such as the telephone ID (i.e., the phone number), a device ID, a user ID, and an email address as well as other information, such as the user profile in the data storage area 184 (see FIG. 2). The user ID may be a user generated name, nickname, or the like. The device ID may vary based on the particular type of the UE 400. For example, if the UE 400 utilizes an Android™ operating system, the device will be assigned an Android™ ID. In addition, the UE 400 may typically be assigned an international mobile equipment identification (IMEI). Any of these device identifications alone may be transmitted to the policy server controller 458. In another alternative embodiment, a unique hash of one or more device IDs may be generated and transmitted to the policy server controller 458 as the device ID. The short-range transceiver 176 (see FIG. 2) may also include an identification, such as a MAC address that is unique to the UE 400. The registration data described above can be provided to the policy server controller 458 along with the MAC address. The registration data may be stored in association with the MAC address. Registration refers to an initial process in which the UE 400 provides identification data to the policy server controller 458. As previously described, this can include identification data for the UE 400 itself (e.g., a MAC address, IMEI, or the like) and user information (e.g., user name/password, profile data, and the like). As noted above, the UE must perform the registration process at least once to provide the policy server controller 458 with the necessary identification information. At subsequent times, the UE 400 is automatically authenticated when it comes within range of one of the APs 448 within the venue 440. Authentication refers to a process in which a previously registered UE 400 is automatically identified based on information provided by the UE during the authentication process and the retrieval of stored identification data stored within the JUMMMP Cloud 456 (see FIG. 6). Once the initial registration process has been completed, subsequent authentications are greatly simplified. During authentication, the web portal page server 458 may transmit other pages, such as the log-in web page 462, one or more interstitial web pages 464, and the welcome web page 466 shown in FIG. 6.

The UE 400 can also perform the initial registration using a conventional wireless service provider network. As previously discussed the UE 400 can communicate with the RAN 406 (see FIG. 4) via the wireless communication link 408 in a conventional manner. Those skilled in the art will appreciate that the UE can access the network 110 via the RAN 406. Conventional wireless service provider components, such as a gateway to the network 110 are known in the art, but not illustrated in FIG. 4 for the sake of clarity. In one embodiment, the UE 400 can perform a registration process with the policy server controller 458 via the RAN 406. In this embodiment, the UE 400 accesses a website, such as the JUMMMP network website 200 illustrated in FIG. 3. In this example, the policy server controller 458 may be associated with the JUMMMP network website 200 (see FIG. 3) or the JUMMMP Cloud 456 of FIG. 6.

Alternatively, the UE 400 may perform an initial registration using a conventional computer (e.g., the user computing device 112 of FIG. 1) to provide the registration data for the UE 400 to the policy controller server 458. For example, the user may make a reservation to visit a hotel, such as the casino venue 440 illustrated in FIG. 5. In a confirmation email from the hotel, the user may be invited to perform a registration process with the policy server controller 458 using, by way of example, a link to a registration web page.

If the UE registration occurs at the venue via an AP (e.g., one of the LTE/NR compatible radios 448 in FIG. 6), the policy control server 458 knows the geographic locale of the UE 400. In this manner, the UE 400 knows that information, such as messages, coupons, advertisements, and the like are received from valid and registered businesses.

In one embodiment, a previously-registered UE 400 may come within range of the initial LTE/NR compatible radio 448 in the venue 440 of FIG. 6 and establish a wireless communication link therewith. In establishing the communication link, the UE 400 transmits its identification data (e.g., MAC address and/or the phone ID or IMEI, or the like). The LTE/NR compatible radio 448 transmits an authentication request message to the policy server controller 458 to determine whether the UE 400 is a registered device. Based on the identification data automatically provided by the UE 400 to the LTE/NR compatible radio 448 and the user information already stored in the JUMMMP Cloud 456, the policy server controller 458 can confirm that the UE 400 has previously registered. Thus, the UE 400 is authenticated whenever it comes into range of any of the LTE/NR compatible radios 448 of the system 100. This may occur transparently to the user. This automatic authentication process can occur even if the initial registration was in a completely different part of the country. Thus, the UE 400 may move from one venue 440 to another in the same city or region or may be in a completely different part of the country and be automatically identified and authenticated with APs that are part of the system 100 described herein.

This convenient registration and authentication avoids the need for constantly searching for a WiFi connection or an LTE connection as required by other systems. Based on this automatic authentication process, the UE 400 may be automatically connected to the WiFi network created by the LTE/NR compatible radios 448 in the venue. The UE 400 may get welcome greetings from the venue and may also receive advertising, offers, discounts, and the like.

Figure 7:
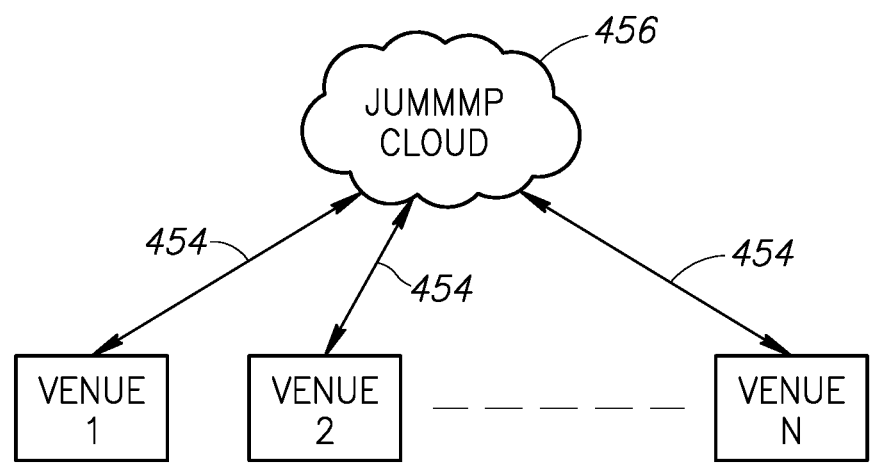
FIG. 7 illustrates the Cloud network of FIG. 6 communicating with multiple venues.

The registration process at a single venue has been discussed above with respect to FIG. 6. The JUMMMP Cloud 456 also advantageously provides a centralized registration function for multiple venues, as illustrated in FIG. 7. The multiple venues 440 are each connected to the JUMMMP Cloud 456 via individual respective backhauls 454. If a UE 400 initially registers at Venue 1, using the registration process described above, that registration information is stored in the JUMMMP Cloud 456. At a later point in time when the user enters, by way of example, Venue 2 illustrated in FIG. 7, the UE 400 will automatically identify the LTE/NR compatible radio 448 and begin to communicate therewith. Because the UE 400 has already been registered, that information is passed along to the JUMMMP Cloud 456 and the UE 400 is automatically authenticated. This is true even if the various venues 440 are located far from one another. For example, an initial registration of the UE may take place at a sports venue in, by way of example, New York City. However, if the UE 400 is carried to a casino in, by way of example, Las Vegas, Nev., the UE 400 will automatically begin to communicate with the LTE/NR compatible radio 448 in the new venue in Las Vegas. Because each venue is coupled to the JUMMMP Cloud 456, the UE 400 need not undergo another registration process when it enters the venue 440 in Las Vegas. Thus, a single registration process at any venue is sufficient for registration with the JUMMMP Cloud 456. Whenever the UE 400 goes into a different venue 440 that is coupled to the JUMMMP Cloud 456, the UE 400 is automatically recognized and authenticated. During the automatic authentication process, the JUMMMP Cloud 456 may provide interstitial portal pages 464 to the UE 400. Upon completion of the automatic registration process, welcome portal pages 466 may then be transmitted to the UE 400.

FIG. 8 illustrates a variation of the system architecture illustrated in FIG. 6, but with additional features that allow data off-loading to be monitored and reported to mobile operator networks 474.

Those skilled in the art will appreciate that WiFi is a high speed wireless technology based on IEEE 802.11 protocol technologies. In contrast, Long Term Evolution (LTE) is a high speed wireless technology based on GSM/EDGE and UMTS/HSPA protocol technologies.

As briefly discussed above, mobile operator networks 474 are implementing 5G wireless networks, which have significantly increased data rates compared with earlier technologies, such as 3G and 4G. Rather than provide WiFi compatible APs 448 (see FIG. 4) in a venue, the functionality of the APs has been supplemented by adding LTE/NR compatible radios 448, shown in FIGS. 6 and 8, in addition to WiFi compatible radios.

If the venue 440 is implemented with WiFi functionality, the UE 400 will search for IEEE 802.11 protocol wireless service provided by a WiFi radio in the AP. In contrast, If the venue 440 is implemented with LTE/NR functionality, the UE 400 will search for available GSM/UMTS service. The LTE/NR compatible radios 448 can operate in a cellular environment and communicate with UEs 400 using GSM/EDGE and UMTS/HSPA protocol technologies. The WiFi compatible radios can operate in a WiFi environment and communicate with UEs 400 using IEEE 802.11 protocol technologies. The connection manager 186 (see FIG. 2) can determine whether a particular UE 400 will seek a WiFi connection or a LTE connection as the primary or preferred connection type.

Both WiFi and LTE support authentication capabilities using RADIUS or Diameter protocols for authentication. Authentication procedures are discussed in greater detail below.

As illustrated in FIG. 8, the venue 440 is equipped with a number of WiFi compatible and LTE/NR compatible radios 448 distributed throughout the venue to provide a desired area of coverage. The table below illustrates the operational differences between use of the WiFi compatible radios and the use of the LTE/NR compatible radios in the venue 440.

|  | Wi-Fi | CBRS/LTE/NR |
| --- | --- | --- |
| UE Wireless Service Transport | Wi-Fi (802.11a/b/g/n/ac/ax) | CBRS/LTE/NR |
| Mobilitie Provided Last Mile Wireless Service (on behalf of carrier) | Wi-Fi | LTE/NR |
| Network Transport Equipment | Traditional Ethernet | 5 G Capable |
| Network Transport Technology | VLAN/VRF | NFV |
| AAA | AAA (RADIUS/ Diameter) | AAA (Diameter) |
| ISP Services | Mobilitie | Carrier |
| Billing Engine | Mobilitie Proprietary | Mobilitie Proprietary |

Implementation using the WiFi compatible radios uses traditional Ethernet technology for network transport. However, the network transport layer (i.e., Layer 2 in the ISO model) can be implemented using a virtual local area network (VLAN) and virtual routing and forwarding (VRF). A conventional LAN can provide connectivity for one or more subnets. With a VLAN, a network switch can provide support for multiple, independent VLANs, creating Layer 2 (data link) implementations of subnets. A VLAN is associated with a broadcast domain and is usually implemented with one or more Ethernet switches.

Virtual routing and forwarding (VRF) technology implemented in IP network routers permits multiple instances of a routing table to exist in a router and operate simultaneously. This improves router and network functionality by allowing network paths to be segmented without using multiple devices. Because traffic is automatically segregated, VRF also increases network security. In some embodiments, the improved network security can eliminate the need for encryption and authentication. An ISP (e.g., the ISP 562 of FIG. 12) can use VRF to create a separate virtual private network (VPN) for each customers.

In contrast, implementation using the LTE/NR compatible radios uses traditional 5G compatible technology for network transport. Furthermore, the network transport layer (i.e., Layer 2 in the ISO model) can be implemented using a network functions virtualization (NFV). NFV eliminates the need for specialized hardware, such as a firewall, and moves the implementation of such network components to servers. A single physical server can provide NFV for multiple networks. For example, the content/firewall server 480 in FIG. 8 can be implemented using NFV. Furthermore, the NFV implementation permits data segmentation that permits a single server to provide NFV for multiple different mobile operator networks 474. The NFV permits a separate segmented network path for each of the mobile operator networks 474. Because traffic is automatically segregated, NFV also increases network security.

FIG. 13 illustrates an exemplary network topology for implementation using cellular radio functionality, such as Citizens Broadband Radio Services (CBRS) LTE/NR radio technology. The front end in FIG. 13 is similar to WiFi network topology in that the UE seeks out and connects with one or more APs 448. However, as described above, the radios in this implementation are LTE/NR compatible radios and the UE 400 uses it network transceiver 166 (see FIG. 2) to communicate therewith.

Data from the infrastructure 450 is carried to the JUMMMP Cloud 456 using NFV technology. In this manner, authentication data from multiple UEs 400 having multiple different mobile operator networks 474 using simplified hardware structures, such as the infrastructure 450, in the form of a 5G capable switch. The NFV can carry the network traffic for different mobile operator networks 474 as different segmented data streams.

Within the JUMMMP Cloud 456, the AAA server 484 can perform authentication functions as a proxy for the different mobile operator networks 474 or communicate directly with the mobile operator network 474 to permit authentication by the mobile operator network itself, as described above with respect to a WiFi implementation. However, data traffic itself may be handled by the NFV The UEs 400 can communicate with one or more WiFi or LTE/NR compatible radios 448. The venue 440 also includes routers and switches, which may be referred to generically as infrastructure 450. As noted above, the infrastructure 450 can be implemented as EPC equipment, which can transport both WiFi and LTE traffic.

The WiFi compatible and LTE/NR compatible radios 448 and the infrastructure 450 together form a local area network (LAN) 478. As one skilled in the art will appreciate, the size and complexity of the LAN 478 depends on the size and layout of the venue 440.

The LAN 478 is coupled to a content/firewall server 480. The content server 480 serves as an interface between the venue 440 and the network 110, such as the Internet. Data uploads from the UEs 400 as well as downloads from the network 110 to the UEs are routed through the LAN 478. The data traffic (uplink and downlink) may flow on the communication link 452.

As previously discussed, the system 100 can also accommodate voice traffic off-loading from the mobile operator networks. In the embodiment illustrated in FIG. 6, voice traffic off-load from the mobile operator network 474 is transferred through the IP transfer point 472 within the JUMMMP Cloud 456. In the embodiment illustrated in FIG. 8, voice traffic off-load may utilize the network 110. Each mobile operator network 474 can off-load voice data traffic from the mobile operator network to the network 110 via communication links 482. In turn, the traffic (both voice traffic and data traffic) may be transferred to the content server 480 via the communication link 452.

To accommodate data off-loading, it is necessary to uniquely identify the UE 400 and determine which mobile operator network 474 is the service provider for a particular UE. It is also necessary to perform an authentication process to assure the identity of the UE 400 and that it is authorized to operate in an off-load operational mode. Those skilled in the art will appreciate that there are a number of unique identifiers for the UE 400. As discussed above, the UE 400 has a MAC address and an IMEI. Other unique identifiers may include an email address, birth date, user name, phone number, Android ID, or a hash of one or more of these unique identifiers. Those skilled in the art will also appreciate that different mobile operator networks may use different unique identifiers. For example, one mobile operator network 474 may use a MAC address, while another mobile operator network may use data contained within a subscriber identity module (SIM) card physically inserted into the UE 400. The system 100 can accommodate the different identification requirements that may be imposed by each mobile operator network 474.

Also illustrated in FIG. 8 is an authentication, authorization, accounting (AAA) server 484 coupled to the LAN 478 via the backhaul 454. There are number of known AAA protocols, such as RADIUS, Diameter, and the like. RADIUS refers to a Remote Authentication Dial-In user Service communication protocol that will authenticate the UEs 400. Diameter is an improvement on RADIUS protocol and permits new commands and attributes using the Extensible Authentication Protocol (EAP). Diameter also includes capabilities negotiation and other elements, but still provides AAA capabilities previously described with respect to RADIUS.

In the embodiment of FIG. 8, the AAA server 484 may be part of the JUMMMP Cloud 456, which is remote from the venue 440. Those skilled in the art will appreciate that the authentication requirements of the mobile operator networks 474 may vary. One category of mobile operator networks 474 may permit authentication of the UE 400 using the AAA server 484 as a stand-alone AAA server while a second category of mobile operator networks may require authentication of the UE 400 using the AAA server that is part of the mobile operator network. The AAA server 484 can function independently in place of the mobile operator networks 474 in the former category and function as a proxy to relay authentication requests to the AAA server of the mobile operator networks in the latter category.

In one embodiment, the AAA server 484 serves as a stand-alone RADIUS/Diameter (or similar) server for the plurality of mobile operator networks 474. As noted above, each mobile operator network 474 may use its own unique identification and authentication data. In this embodiment, the AAA server 484 contains all of the necessary data provided by the mobile operator networks 474 to provide such authentication services.

In this embodiment, the UE 400 connects to one of the plurality of LTE/NR compatible radios 448 and provides the necessary identification data. More information on this interaction will be provided below. The LAN 478 provides the identification data to the RADIUS/Diameter system proxy AAA server 484 for authentication of the UE 400.

In an alternative embodiment, the AAA server 484 functions as a proxy and receives the identification data as well as the identity of the particular mobile operator network. The proxy AAA server 484 establishes a secure AAA link 486 with the appropriate mobile operator network 474. In an exemplary embodiment, a virtual private network (VPN) connection can be established as the secure link 486 with the mobile operator network 474. The identification data from the UE 400 is provided to the particular mobile operator network 474 using the VPN. Other forms of secure communication are known and can be satisfactorily employed. In this alternative embodiment, the authentication process is performed by the mobile operator network 474 and the authentication results are returned to the AAA server 484.

Whether the authentication is done by the stand-alone version of the AAA server 484 or by functioning as a proxy for the mobile operator networks 474, the UE 400 will be authenticated or not authenticated. In one embodiment, any UE that is not authenticated will not be permitted access to the network 110. Alternatively, the UE 400 can be provided with a restricted authentication to permit limited access to the network 110. For example, classification of users may result in upgraded services to particular mobile operator networks tiers. Other UEs 400 not within that service network may gain access to the network 110, but a lesser bandwidth.

As described above, a UE 400 that has never registered with the JUMMMP Cloud 456 (see FIG. 6) may be offered the opportunity to register and be authenticated within the venue 440. However, the system described herein may still offer data off-loading from the mobile operator network 474 even when it has not previously been registered with the JUMMMP Cloud 456. The off-loading may still occur because the AAA server 484 is verifying the identity of the UE 400 with respect to the mobile operator network 474 for which the UE is a subscriber.

The authentication process described above is sufficient for the UE 400 using a WiFi connection to the LAN 478. For authentication of the UE 400 using the LTE communication protocol, those skilled in the art will appreciate that the UE 400 has a primary SIM card that is compatible with one of the mobile operator networks 474 and will seek to establish a cellular connection with a cell tower for that particular mobile operator network. In the embodiment of FIG. 8, it is necessary for the UE 400 to establish a cellular connection with one of the LTE/NR compatible radios 448 to establish a data off-load session. To perform this function, the UE 400 is equipped with a second SIM card configured to seek a cellular connection with the LTE/NR compatible radios 448. Just as the primary SIM card is used to associate the UE 400 with a specific mobile operator network 474, the secondary SIM card can be used to associate the UE with the LTE/NR compatible radios 448.

It is not necessary to remove the primary SIM card to associate the UE 400 with the LTE/NR compatible radios 448. Many mobile phones are capable of operation with multiple SIM cards. In some implementations, there actually different physical SIM cards inserted into the UE 400. However, there are also mobile phones capable of operation with multiple SIM card data contained in a single SIM card. In either implementation, the secondary SIM card will cause the connection manager 186 (see FIG. 2) in the UE 400 to try to establish a cellular connection with the LTE/NR compatible radios 448.

The authentication process described above for the WiFi implementation can be used to authenticate the UE using the cellular connection to the LTE/NR compatible radios 448. That is, the data in the secondary SIM card can be used to authenticate the UE 400 using the stand-alone version of the AAA server 484 or by functioning as a proxy for the particular mobile operator network 474 associated with the UE 400. As with the WiFi implementation of the authentication, the UE 400 will be authenticated or not authenticated.

If the UE 400 is authenticated, the UE may be placed in an off-load operational mode. In this mode, both voice traffic to and from the mobile operator network 474 and data traffic to and from the UE 400 may be routed through the LAN 478. Alternatively, the off-load session may be for voice traffic only or for data traffic only. As discussed above, the mobile operator network 474 may have a set of rules regarding voice traffic off-load to the UE 400. Alternatively, the UE 400 may be programmed with user preferences regarding maintaining a connection with the cellular network or seeking to connect with the LTE/NR compatible radios 448 for voice traffic off-loading.

In the embodiment illustrated in FIG. 8, the voice traffic is off-loaded through the links 482 to the network 110 and routed to the specific UE 400 via the LAN 478. In this mode of operation, the voice traffic essentially becomes part of a VoIP telephone network.

The data traffic to and from the UE 400 is coupled through the LAN 478. As noted above, the network 110 may represent the Internet. If a user of an authenticated UE 400 wishes to access the Internet, user may activate a built-in web browser in the UE and send a command to the LAN 478 to access a particular web page by transmitting the appropriate Uniform Resources Locator (URL). That request is routed to the network 110 via the content server 480. Those skilled in the art will appreciate that data requests transmitted from the UE 400 and data downloads from a particular website on the network 110 are transmitted in a conventional manner. Operational details of the actual data transfer are known to those skilled in the art and need not be described herein.

However, the LAN 478 monitors the quantity of data transmitted from the authenticated UE 400 or received by the authenticated UE. In the example above, the transmission of a URL is an upload that is sent from the UE 400 to the network 110 via the LAN 478. Elements within the LAN 478, such as the router or switches of the infrastructure 450, may be configured to monitor the data flow to and from each of the authenticated UEs 400. The LAN 478 provides the data utilization information to a billing engine 488 via the AAA server 484. In an exemplary embodiment, the billing engine may also be part of the JUMMMP Cloud 456. The data utilization may be reported to the respective mobile operator networks 474 as a data utilization log. The data utilization can be reported periodically, or accumulated and reported at the end of a particular data session or reported at the end of each day, or the like. The time at which data utilization can be reported can also vary from one mobile operator network 474 to another.

The billing engine 488 connects to each of the mobile operator networks via a secure communication link 490 to provide a report of the data utilization. In an exemplary embodiment, the billing engine 488 can establish a VPN as the secure communication link 490. The utilization report can be provided to the mobile operator network 474 in the form of a file transfer or email. The billing engine 488 can also provide web access to permit the mobile operator network 474 to retrieve the utilization report from the billing engine 488. Those skilled in the art will appreciate that the billing engine 488 can format the utilization data into any format required by the billing server (not shown) in each of the mobile operator networks 474 and provide the utilization reports in different manners (e.g., email, web access, etc.) that is customized for each mobile operator network.

FIG. 9 illustrates an example table illustrating the data utilization by the LAN 478. The table includes the unique identification of the UE 400, identification of the mobile operator network 474, and a data entry listing the number of bytes transmitted and received during a particular session. The session duration is also listed in the table of FIG. 9. As illustrated in FIG. 9, other data may be provided for billing verification, but need not be essential to the system herein. That data may include the date and time, location and specific identification of the LTE/NR compatible radios 448 (see FIG. 8), and a received signal strength index (RSSI) value. In an LTE implementation of the data off-load session, the RSSI value is unnecessary.

The general operation of the exemplary embodiment illustrated in FIG. 8 is described in the flow charts of FIGS. 10A-10B. At a start 500, in FIG. 10A, a venue 440 (see FIG. 8) comprises a plurality of WiFi compatible and LTE/NR compatible radios 448. Steps 502-507 merely describe the conventional process by which a UE 400 identifies and connects with an AP.

At step 502, the radios in the AP 448 transmit a beacon signal containing an identification beacon signal. WiFi compatible radios transmit a beacon signal in accordance with IEEE 802.11 while the cellular radios (e.g., the LTE/NR compatible radios 448 transmit a cellular beacon signal in accordance with the selected cellular technology (e.g., GSM, CDMA, LTE, NR, and the like). In one embodiment, the WiFi compatible radios 448 can transmit the same WiFi SSID for detection by all UEs 400 no matter which mobile network operator 474 provides service. That is, all UEs 400 are configured to seek the same SSID for WiFi network authentication irrespective of the particular mobile operator network 474 associated with that UE. For example, the transmitted SSID may be CDOBM (Carrier Data Off-load By Mobilitie) or some other convenient label. Alternatively, the WiFi compatible radios 448 are capable of transmitting multiple SSIDs or cellular beacon signals for detection by the UE 400. In this embodiment, each of the WiFi compatible radios 448 may transmit an SSID or cellular beacon that is unique to each of the mobile operator networks 474. In yet another alternative, some of the mobile operator networks 474 may use unique SSIDs or cellular beacons while other mobile operator networks 474 can use the common SSID (e.g., CDOBM) or beacon. The system 100 is not limited by the specific SSID or beacon. In yet another alternative embodiment, IEEE 802.11u defines organization unique identifiers (OUI) that can be uniquely defined for each of the mobile operator networks 474. In this embodiment the beacon signal can contain up to three roaming OUI. Up to 32 additional networks may be identified in data sent to a UE 400 in response to a request.

Also at step 502, the LTE/NR compatible radios 448 transmit a cellular beacon signal containing an identification beacon signal. Operation of cellular beacon signals is known in the art and need not be described in greater detail herein.

In step 504, the UE 400 detects the transmitted beacon signal from one or more of the WiFi compatible or LTE/NR compatible radios 448. The UE can evaluate the beacon signal(s) without having to associate with a particular one of the WiFi compatible radios or the LTE/NR compatible radios 448. In step 505, the UE 400 may transmit an Access Network Query Protocol (ANQP) request to the detected the WiFi compatible radios 448 to obtain further information as to the capabilities of the WiFi compatible radios. Similar requests can be made by the UE 400 to the LTE/NR compatible radios.

In step 506, the WiFi compatible radios 448 respond to the ANQP query and provide information regarding the attributes of the particular WiFi compatible radio. As previously discussed, the beacon from the WiFi compatible radios 448 may include an OUI. A response to the ANQP query can include data for up to 32 additional networks. In addition, the response to the ANQP query will return available access services, such as 3GPP, realms, EAP, and the like to permit the UE 400 to associate with the WiFi compatible radio 448 providing the best access. The LTE/NR compatible radios 448 also respond to requests for radio capabilities. In step 507 the UE selects and associates with a particular one of the WiFi compatible radios or the LTE/NR compatible radios 448.

In step 508, the UE 400 transmits its authentication credentials. As previously discussed, this may include device identification data such as a MAC address, electronic serial number, or other identifying information. Some UEs 400 may include a primary or secondary SIM to provide such authentication credentials. In an exemplary embodiment, the infrastructure 450 (see FIG. 8) tunnels the authentication credentials from the venue 440 to the JUMMMP Cloud 456 via the backhaul 454.

As previously discussed, there are alternative approaches for authentication. In one embodiment, the AAA server 484 (see FIG. 8) can operate as a stand-alone authentication server for the mobile operator network. In this embodiment, the mobile operator network 474 has downloaded the appropriate authentication data for its customers to the AAA proxy server 484. In step 510, the AAA server 484 receives the authentication credentials for the UE 400 and uses the authentication data from the appropriate mobile operator network 474 to perform an authentication process. As noted above, if a UE 400 is not authenticated, it will not be granted access to the network 110 (see FIG. 8) or may be granted some form of restricted access. On the other hand, if the UE 400 is authenticated, the AAA server 484 permits the connection between the UE 400 and the network 110 using the LAN 478. The AAA server 484 also configures the LAN 478 to monitor data flow to and from the newly authenticated UE 400.

Alternatively, the AAA server 484 may be configured as a proxy server to pass the identification information along to the respective mobile operator network. In this embodiment, the AAA server 484 does not perform the authentication process directly. Instead, in step 512, the AAA server 484 serves as a proxy and transmits the authentication request to the mobile operator network. The AAA server 484 establishes the secure communication link 486 to the mobile operator network 474 corresponding to the UE 400 that has requested authentication. In this embodiment, the authentication process is executed by the mobile operator network 474. In step 514, the mobile operator network 474 authenticates the UE. As discussed above with respect to the AAA server 484, only authenticated UEs will be granted access to the network 110.

If a UE 400 is authenticated and authorized to access the network 110, the LAN 478 may initiate data off-loading monitoring in step 516, shown in FIG. 10B. This includes monitoring of all data flow to and from each authenticated UE 400.

In step 518, the LAN 478 reports data utilization to the AAA server 484. Those skilled in the art will appreciate that the reporting can be done in a manner that accommodates the particular mobile operator network 474. For example, the data utilization may be reported periodically (e.g., at regular intervals or some "not-to-exceed" time interval). In another example, a data utilization report can be generated at the termination of each session. As illustrated in FIG. 9, the session durations can vary in length. As a session is terminated, the data utilization can be reported to the AAA server 484. In yet another alternative embodiment, the data utilization can be reported at the end of the day or some other time deadline.

In decision 520, the LAN 478 determines whether an off-load session has ended. If the off-load session has not ended, the result of decision 520 is NO and, the system returns to step 518. Step 518 illustrates an optional data utilization report generation. If the result of decision 520 is YES, the system moves to step 522 and sends a final data utilization report. The process ends at 524.

The system has been described for a large venue having a great number of WiFi compatible and/or LTE/NR compatible radios 448 and significant infrastructure 450. New construction simplifies the installation of such a system. However, a large venue, such as that illustrated in FIG. 8, can also be easily updated. This may be important where a venue already has an existing infrastructure 450. In a large venue, the multiple ones of the WiFi compatible radios 448 are configured for operation with the selected SSID (e.g., CDOBM) or cellular beacon via a simple software upgrade. Since the software on the WiFi compatible radios 448 is routinely updated, it can be easily configured to support the data off-load utilization and billing described above. As modified, the WiFi compatible radios 448 would transmit a predetermined SSID, such as CDOBM or a predetermined cellular beacon in the case of LTE/NR compatible radios.

For simple operation, the WiFi compatible radios 448 need to be configured to support Hotspot 2.0. Since Hotspot 2.0 is an industry standard, this upgrade is generally straightforward. When the WiFi compatible radios 448 have been updated, it is possible to create the new SSID, such as CDOBM, or the new cellular beacon. The WiFi compatible radios 448 are further configured to support IEEE 802.1x authentication with conventional communication protocols, such as an extensible authentication protocol (EAP) or GSM/UMTS protocols. Those skilled in the art will appreciate that other protocols or variations on EAP may be used. For example, a certificate-based EAP may become a standard communication protocol in the future. In such a future arrangement, an EAP-TLS or EAP-TTLS may be used. The present system is not limited by the specific conventional communication protocols. In one embodiment, the WiFi compatible radios 448 may use EAP with the secondary SIM card. The EAP-SIM protocol may be used in conjunction with the global system for mobile communications (GSM) technology for authenticating and generating session keys. It is known to use an authentication and key agreement (AKA) communication protocol with EAP for cellular operation of the UEs 400. For example, EAP-AKA can be used in UTMS mobile devices for authentication and session keys. In wireless networks, an EAP-AKA', which is a revision of EAP-AKA, can be used to support authentication on a non-3GPP network.

The AAA server 484 must be configured for stand-alone operation or as a proxy server to the mobile operator networks 474 for authentication. The billing engine 488 may be populated with the data to recognize the new venue 440 and the LTE/NR compatible radios 448 associated therewith.

In an exemplary embodiment, the WiFi compatible radios 448 may also be configured to have the appropriate wireless multimedia extensions (WMM) to establish WMM quality of service (QoS) for voice traffic. In an exemplary embodiment, a virtual LAN (VLAN) may be established as appropriate for local wireless LAN (WLAN) to separate traffic types or to adhere to local policies within the venue 440. Local VLAN DHCP/DNS may be provided by the venue 440.

Finally, the appropriate sites may be established on the AAA server 484 and the billing engine 488 in the JUMMP Cloud 456 to configure the authentication accounting and reporting functions of those elements. Once the AAA server 484 and billing engine 488 have been properly configured, the software updates can be downloaded to the WiFi compatible or LTE/NR compatible radios 448. The UEs 400 are configured to look for the selected SSID (e.g., CDOBM) or the OUI for the mobile operator network associated with a particular UE or the cellular beacon, as discussed above with respect to the GSM/UMTS implementation. Accordingly, the WiFi compatible radios 448 will automatically begin to broadcast the beacons containing the appropriate SSID (or OUI), and the LTE/NR compatible radios transmit a cellular beacon and the UEs 400 will automatically recognize those beacon signals. Thus, the communication system will automatically begin to operate with the billing system described herein.

In an alternative embodiment, WiFi compatible radios 448 with identical IEEE 802.11u access at a particular location, such as the venue 440, can be grouped together by sharing the same homogeneous extended service set ID (HESSID). The HESSID is used by the UE 400 to identify WiFi compatible radios 448 with the same network access after it is associated with one of the WiFi compatible radios to prevent the UE from roaming to an WiFi compatible radio not configured for operation with IEEE 802.11u or in accordance with GSM/UMTS in the case of LTE/NR compatible radios 448.

It is important to note that these changes may generally be performed by software only without the necessity of additional hardware within the venue 440. In some embodiments, the WiFi compatible radios 448 may come preconfigured with the necessary beacon data (e.g., SSID and OUI) or cellular beacon and configuration software as described above. This provides a simplified solution as a "plug and play" device.

Returning to FIG. 8, in an alternative embodiment, a UE may not have direct communication with an LTE/NR compatible radio 448, but can communicate with a nearby UE that does have a connection with an LTE/NR compatible radio 448. For example, FIG. 8 illustrates the wireless connection between the UE 400 and the LTE/NR compatible radio 448. The UE 402*a* is out of range of the LTE/NR compatible radios 448, but can establish a communication link with the UE 400. Thus, the UE 402*a* is piggybacked to the UE 400 and can communicate with the LTE/NR compatible radio 448 via the UE 400. One can appreciate that uploads and downloads to and from the UE 402*a* must not be billed to the UE 400, which is merely serving as a relay point between the UE 402*a* and the LTE/NR compatible radio 448. As described above, the UE 400 would transmit an SSID, such as JUMMMP, to identify itself as able to establish the short range network 116 (see FIG. 1). Using the principles described herein the UE 402*a* would search for the SSID (e.g., CDOBM) being transmitted from the LTE/NR compatible radios 448 to establish an off-load data session. If the UE 402*a* is unable to detect the selected SSID (e.g., CDOBM), the connection manager 186 (see FIG. 2) in the UE 402*a* can reconfigure the device to search for the JUMMMP SSID being transmitted by the UE 400. If the connection is successful, the UE 402*a* can communicate with the LTE/NR compatible radio 448 via the UE 400. Once the link between the UE 402*a* and the LTE/NR compatible radio 448 is established via the UE 400, the UE 402*a* can perform the ANQP to retrieve carrier data for the various mobile operator networks 474. The authentication process for the UE 402*a* is carried out in essentially the same manner as described above. The infrastructure 450 monitors the data flow with the UE 402*a* as the source or destination to thereby monitor data utilization of the UE 402*a* even though the data passes through the UE 400.

This process can be extended to other UEs that may only be able to connect to the UE 402*a*. For example, the UE 402*b* in FIG. 8 can connect directly to the WiFi compatible radio 448 or connect to the LTE/NR compatible radio 448 via the UE 400 and the UE 402*a*. Thus, the UE 402*b* is piggybacked on both the UE 402*a* and the UE 400.

The piggybacking process is illustrated in the flow chart of FIG. 11 where, at a start 530, the infrastructure 450, such as illustrated in FIG. 8, is in place. In step 532, the LTE/NR compatible radios 448 are configured to function as access points and mesh root access points. The LTE/NR compatible radios 448 support communication with the UEs 400 operating in a standard operating mode or a mesh operating mode. Those skilled in the art will appreciate that a root LTE/NR compatible radio 448 is one that is connected to traditional network structures, such as the infrastructure 450.

In step 534, the UEs 400 are configured to operate as mesh stations. Mesh functionality can be enabled with a conventional application program or as part of the API, as described above. In step 536, the UEs 400 discover all nearby UEs and begin a peer-to-peer process with them. Those skilled in the art will appreciate that each UE 400 will build an optimal path to the root LTE/NR compatible radios 448. The root LTE/NR compatible radio 448 for one UE 400 may be different than the root LTE/NR compatible radio for a different UE 400.

In step 538, each mesh UE will begin to broadcast a beacon. In an exemplary embodiment, the UE 400 will broadcast BSSID with 802.11u/Hotspot 2.0 beacons. IEEE 802.11u allows a mesh UE 400 to broadcast its roaming capabilities, such as external network access, supported authentication, available bandwidth, and the like. A non-mesh UE (e.g., the UE 402*a*) can decide to join based on information in the mesh UE beacons. If such roaming is supported, the UE 402*a* will roam to the mesh UE 400 without any user interaction.

Returning to FIG. 11, in step 540, the UE 402*a* detects the Hotspot 2.0 beacons during a scan and will send ANQP requests to nearby UEs 400. The UEs 400 respond to the UE 402*a* with requested information. The UE 402*a* can verify the responses and select one of the mesh UEs 400 to associate with.

In step 542, the UE 402*a* performs the authentication process. In an exemplary embodiment, the UE 402*a* can use conventional communication protocols, such as EAP-SIM and/or EAP-TTLS or EAP-AKA', as discussed above. The EAP packets are forwarded over mesh links to the APs 448 for processing. The LTE/NR compatible radio 448 will proxy the EAP packets to the AAA server 484 for proxy authentication or for forwarding directly to mobile operator networks 474 for authentication of the UE 402*a* in the manner described above. Those skilled in the art will appreciate that all data communication traffic between the UE 402*a* and the root LTE/NR compatible radio 448 is encrypted to prevent man-in-the-middle attacks on communications between the UE 402*a* and the LTE/NR compatible radio 448. Similarly, traffic between the mesh UEs 400 and the LTE/NR compatible radios 448 and peer-to-peer communications between the UEs 400 are also encrypted. In a typical embodiment, the UEs 400 may use conventional encryption protocols, such as the advanced encryption standard (AES).

Following a successful authentication process, the UE 402*a* will have an encrypted tunnel to the root LTE/NR compatible radio 448 for all data packets to and from the UE 402*a*. At step 544, data packets to and from the UE 402*a* are routed through the encrypted tunnel via the UE 400 to the LTE/NR compatible radio 448. In step 546, data traffic to and from the piggybacked UE (i.e., the UE 402*a*) is monitored. In an exemplary embodiment, the root LTE/NR compatible radio 448 will build accounting records based on data packets transmitted to and received from the UE 402a and forward the accounting information to the billing engine 488. The process ends at 548.

In this implementation, the UE 402 may move to any nearby UEs 400 that are coupled to the same root LTE/NR compatible radio 448 because that LTE/NR compatible radio 448 has handled the authentication process. In addition, the UE 402a may roam to another one of the LTE/NR compatible radios 448. The current LTE/NR compatible radio 448 will send accounting stop information to the billing engine 488 and the new LTE/NR compatible radio 448 will issue an accounting start after a successful roaming transition.

The peer-to-peer tunneling described above may be based on IEEE 802.11s for wireless mesh networks. The peer-to-peer communication provides secure discovery through authenticated mesh peering exchange (AMPE) and validates mobile devices that participate as mesh stations. As noted above, encryption, such as AES, may be used for all peer-to-peer communication. In addition, a hybrid wireless mesh protocol (HWMP) provides path selection to a root AP 448. This protocol may support proactive and reactive path selections. A proactive path selection maps out the optimal network path for communications. A reactive path selection allows dynamic path alteration in the event of changes in the topology of the mesh network. For example, if the UE 402a is piggybacked to the UE 400 and that UE goes off line, it will be necessary for the UE 402a to react and thereby establish a new communication pathway to the root LTE/NR compatible radio 448. Pathway selection also allows a roaming UE 400 to connect through multiple mesh stations (i.e., UEs 400 configured for mesh operation) based on the best pathway metrics for factors such as reliability, QoS, and the like. When more than one UE 400 are operating in a mesh configuration, there are multiple exit points for the UE 402a to gain access to one or more root LTE/NR compatible radios 448. If a UE 400 that is currently providing a connection to a root LTE/NR compatible radio 448 drops off of the network, one of the additional mesh configured UEs 400 will take over that role. This system architecture provides a more dynamic solution that improves overall network reliability.

In yet another alternative embodiment, the UE 400 can be configured to transmit the selected SSID (e.g., CDOBM) when data off-loading is available. In this embodiment, the UE 402a need only search for the selected SSID, as described above. The UE 402a is configured to connect to the connection point (either one of the LTE/NR compatible radios 448 or the UE 400) with the strongest signal strength.

The multi-venue authentication permits fast and automatic authentication of a previously registered UE 400 as soon as it encounters an LTE/NR compatible radio 448 in any venue 440 connected to the JUMMMP Cloud 456. If data off-loading capability is available in the venue 440, the process described above can occur automatically and without user intervention.

The example of FIG. 8 illustrates data off-loading in a large venue 440 that typically includes a large number of LTE/NR compatible radios 448 and an extensive infrastructure 450. However, the principles of data off-loading and monitoring of data utilization can be accomplished in a small environment, such as a home, small business, or office, as illustrated in FIG. 12. In FIG. 12, the LAN 478 has been replaced by a modem/wireless router 560 to function as the LTE/NR compatible radio. Although these functions can be implemented by separate devices, they are shown as an integrated unit in FIG. 12 for the sake of convenience. Furthermore, many internet service providers (ISPs) provide an integrated unit. The modem portion of the LTE/NR compatible radio/router/modem 560 contains the necessary interface hardware and supporting software to permit communication with an ISP 562. Those skilled in the art will appreciate that the specific implementation of the modem portion depends on the type of connectivity between the LTE/NR compatible radio/router/modem 560 and the ISP 562. This may include, but is not limited to, cable, telephony, fiber optics, microwave, or other radio-frequency connection.

The wireless router portion of the LTE/NR compatible radio/router/modem 560 operates in a conventional manner to provide internet connectivity to the UEs 400 or the UE 402a, which may be piggybacked on to the UE 400 in the manner described above.

In this implementation, the LTE/NR compatible radio/router/modem 560 can be configured through a simple software upgrade to support data off-load billing. No hardware changes are required to the modem/router to provide such capability. Since the software on the LTE/NR compatible radio/router/modem 560 is routinely updated, it can be easily configured to support the data off-load utilization and billing described above. Based on the teachings described herein, any new or existing WiFi network can automatically become a billing engine for any or all mobile operator networks 474 (see FIG. 12). As modified, the LTE/NR compatible radio/router/modem 560 would transmit a predetermined SSID, such as CDOBM and/or a cellular beacon. As described above, the connection manager 186 (see FIG. 2) in the UE 400 seeks out and connects with a wireless device transmitting such an SSID or cellular beacon. Device authentication occurs in essentially the same manner described above. However, in the embodiment illustrated in FIG. 12, authentication data is routed to the AAA server 484 via the ISP 562 rather than through the backhaul 454 in the embodiment of FIG. 8. Although not illustrated in FIG. 12, the connection between the ISP 562 and the JUMMMP Cloud 456 may typically occur via the network 110, such as the Internet. However, the specific connection between the ISP 562 and the JUMMMP Cloud 456 may be satisfactorily implemented via the network 110, a backhaul 454 or any other suitable form of communication.

The AAA server 484 performs the authentication process in the manner described above. As previously noted, the AAA server 484 may operate as a proxy RADIUS/Diameter server for the plurality of mobile operator networks 474 or may serve as a communication link to provide the authentication data to a particular one of the mobile operator networks. Once the UE 400 (or UE 402a) is authenticated, the data utilization may be monitored. In the embodiment of FIG. 12, the LTE/NR compatible radio/router/modem 560 has the responsibility for tracking data utilization. This is conveniently implemented since all data flow between the ISP 562 and the UEs 400 (or UE 402a) occur via the LTE/NR compatible radio/router/modem 560.

The billing engine 488 may periodically query the LTE/NR compatible radio/router/modem 560 to get updated data utilization. Alternatively, the LTE/NR compatible radio/router/modem 560 may periodically report data utilization. In yet another alternative embodiment, the LTE/NR compatible radio/router/modem 560 may report data utilization based on an event, such as the termination of a communication session between a UE 400 and a website or termination of a connection between the UE 400 and the LTE/NR compatible radio/router/modem 560.

Data is downloaded to the UEs 400 or uploaded from the UEs 400 via the ISP 562. The ISP 562 may include the content/firewall server 480, which is located within the venue 440 in the embodiment of FIG. 8. In the embodiment of FIG. 12, the functionality of the content/firewall server 480 may also be implemented within the LTE/NR compatible radio/router/modem 560. In yet another alternate embodiment, the functionality of the content/firewall server 480 may also be implemented within the core network of each respective mobile operator network 474. Those skilled in the art will appreciate that many modern modems include data firewall capability. All standard approaches are supported.

As noted above, the only hardware change required for the implementation of the billing engine system described herein is the change from a WiFi based communication link to a multi-protocol communication link with the LTE/NR compatible radio/router/modem 560. This change permits the use of WiFi communication links or cellular communication links.

Those skilled in the art will appreciate that the UEs 400 (and UE 402a) illustrated in FIG. 12 may be associated with different mobile operator networks 474. For example, one UE 400 may be associated with one mobile operator network 474 while the other UE 400 or UE 402a may be associated with a different mobile operator network 474. Identification of the particular mobile operator network occurs in the manner described above. Thus, the exemplary embodiment illustrated in FIG. 12 can operate satisfactorily with multiple mobile operator networks without regard to the identity of the particular mobile operator network 474 or the particular data billing procedures implemented by any network. Furthermore, the UEs 400, configured in the manner described herein can operate satisfactorily in different venues, such as the home venue environment illustrated in FIG. 12 or in a large venue, such as illustrated in FIG. 8. The hardware and infrastructure support shown for the embodiments of FIGS. 8 and 12 are different, but the billing engine described herein works equally well in either environment or in other similar environments.

As noted above, the LTE/NR compatible radio/router/modem 560 in FIG. 12 can be easily configured for operation with the data off-load billing techniques described herein. This allows simple implementation of the data utilization monitoring. This is true in an enterprise or customer facing venue, such as the venue 440 illustrated in FIG. 8, supporting venues, retail, or the like. The plug and play solution described above with respect to FIG. 8 is also applicable in a home environment, such as described in FIG. 12 or any other WiFi or cellular enabled location, such as office buildings, parks, colleges, libraries, open spaces, and the like.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A method for data utilization tracking in a wireless communication device, the wireless communication device being associated with a one of a plurality of mobile operator networks and using a cellular network transceiver to communicate therewith and a short-range transceiver for communicating with other than the mobile operator networks, the method comprising:
   a first of a plurality of wireless access points (APs) distributed throughout the venue receiving an authentication request from the cellular network transceiver or the short-range transceiver of the wireless communication device, the authentication request including identification information that uniquely identifies the wireless communication device and identifies the one of the plurality of mobile operator networks associated with the wireless communication device;
   transmitting the authentication request to an authentication server;
   upon authentication of the wireless communication device by the authentication server, establishing a communication link between the authenticated wireless communication device and a wide area network via the wireless access point to thereby initiate operation of the wireless communication device in a data off-load operational session;

monitoring data utilization of the authenticated wireless communication device during the respective data off-load operational session; and establishing a communication link with the one of the plurality of mobile operator networks associated with the wireless communication device to provide an indication of data utilization for the authenticated wireless communication device to the one of the plurality of mobile operator networks associated therewith.

2. The method of claim 1 wherein the plurality of APs are configured for operation in accordance with IEEE 802.11 communications protocol.

3. The method of claim 2 wherein transmitting the authentication request to the authentication server comprises transmitting the authentication request using a virtual local area network (VLAN).

4. The method of claim 2 wherein transmitting the authentication request to the authentication server comprises transmitting the authentication request using virtual routing and forwarding (VRF).

5. The method of claim 1 wherein the plurality of APs are configured for operation in accordance with long term evolution (LTE) communications protocol wherein receiving the authentication request from the cellular network transceiver comprises establishing a cellular communication link between the wireless communication device and the AP that does not use a cellular communication link between the wireless communication device and the mobile operator network associated with the wireless communication device.

6. The method of claim 1 wherein the plurality of APs are configured for operation in accordance with a 5G compatible new radio (NR) communications protocol wherein receiving the authentication request from the cellular network transceiver comprises establishing a cellular communication link between the wireless communication device and the AP that does not use a cellular communication link between the wireless communication device and the mobile operator network associated with the wireless communication device.

7. The method of claim 6 wherein transmitting the authentication request to the authentication server comprises transmitting the authentication request using a network function virtualization (NFV).

8. The method of claim 6 wherein transmitting the authentication request to the authentication server comprises transmitting the authentication request using a network function virtualization (NFV) data segmentation associated with the one of the plurality of mobile operator networks.

9. The method of claim 1 wherein transmitting the identification information of the wireless communication device requesting authentication comprises transmitting the identification information of the wireless communication device requesting authentication to an authentication server for the one of the plurality of mobile operator networks identified as associated with the wireless communication device requesting authentication.

10. The method of claim 1 wherein transmitting the identification information of the wireless communication device requesting authentication comprises transmitting the identification information of the wireless communication device requesting authentication to a proxy authentication server for authentication for the one of the plurality of mobile operator networks identified as associated with the wireless communication device requesting authentication.

11. The method of claim 1 wherein monitoring data utilization comprises monitoring a quantity of data downloaded to the wireless communication device and monitoring a quantity of data uploaded from the wireless communication device.

12. The method of claim 1 wherein the off-load operational session may be conducted between the wireless communication device and any of the plurality of APs.

13. The method of claim 1, further comprising terminating a cellular network connection between the wireless communication device and the mobile operator network upon establishing the off-load operational session.

14. The method of claim 1 wherein the authentication server is a RADIUS server.

15. The method of claim 1 wherein the authentication server is a Diameter server.

16. A system for data utilization tracking in a wireless communication device having a cellular network connection with one of a plurality of mobile operator networks using a cellular network transceiver and having a wireless non-network connection using a second transceiver different from the cellular network transceiver, comprising:

a local area network (LAN) having plurality of wireless access points (APs) with a first of the plurality of APs, serving as an initial wireless access point, configured to receive an authentication request from the wireless communication device cellular network transceiver or the wireless communication device second transceiver, the authentication request including identification information that uniquely identifies the wireless communication device and identifies one of the plurality of mobile operator networks associated with the wireless communication device wherein receiving the authentication request from the wireless communication device cellular network transceiver comprises establishing a cellular communication link between the wireless communication device and the AP that does not use the cellular network connection between the wireless communication device and the one mobile operator network associated with the wireless communication device;

an authentication server configured to receive the authentication request from the wireless communication device requesting authentication and to authenticate an identity of the wireless communication device, and, upon authentication of the wireless communication device, authorizing the establishment of a communication link between the authenticated wireless communication device and a wide area network (WAN) via the LAN to thereby initiate operation of the wireless communication device in a data off-load operational session;

a data traffic monitor configured to monitor data traffic between the WAN and the authenticated wireless communication device to thereby monitor data utilization of the authenticated wireless communication device during the data off-load operational session; and a billing engine configured to establish a secure communication link with the mobile operator network associated with the wireless communication device to provide data utilization information for the authenticated wireless communication device to the associated mobile operator network.

17. The system of claim 16 wherein the plurality of APs are configured for operation in accordance with IEEE 802.11 communications protocol.

18. The system of claim 17 wherein the authentication server is configured to receive the authentication request transmitted from the LAN using a virtual local area network (ULAN).

19. The system of claim 17 wherein the authentication server is configured to receive the authentication request transmitted from the LAN using a virtual routing and forwarding (VRF) communication protocol.

20. The system of claim 16 wherein the plurality of APs are configured for operation in accordance with long term evolution (LTE) communications protocol.

21. The system of claim 16 wherein the plurality of APs are configured for operation in accordance with a 5G compatible new radio (NR) communications protocol.

22. The system of claim 21 wherein the authentication server is configured to receive the authentication request transmitted from the LAN using a network function virtualization (NFV).

23. The system of claim 21 wherein transmitting the authentication request to the authentication server comprises transmitting the authentication request using a network function virtualization (NFV) data segmentation associated with the one of the plurality of mobile operator networks.

24. The system of claim 16 wherein the plurality of APs have programmable radios configured for operation in accordance with either IEEE 802.11 or long term evolution (LTE) communications protocols and are configured to receive the authentication request from the second transceiver by establishing a communication link between the wireless communication device and the AP in accordance with IEEE 802.11 communications protocols or are configured to receive the authentication request from the cellular network transceiver by establishing a cellular communication link between the wireless communication device and the AP in accordance with LTE communications protocols.

25. The system of claim 16 wherein the authentication server comprises an authentication server associated with the one mobile operator network identified as associated with the wireless communication device requesting authentication and the authentication of the wireless communication device requesting authentication is performed by the authentication server associated with the one mobile operator network.

26. The system of claim 25 wherein the authentication server associated with the one mobile operator network is configured to receive the authentication request transmitted from the LAN using a network function virtualization (NFV) data segmentation associated with the one of the plurality of mobile operator networks.

27. The system of claim 16 wherein the authentication server is proxy authentication server serving as a proxy for the one mobile operator network associated with the wireless communication device wherein the wireless communication device requesting authentication to the proxy authentication server is authenticated without direct authentication by the one associated mobile operator network.

28. The system of claim 27 wherein the proxy authentication server for the one mobile operator network associated with the wireless communication device is configured to receive the authentication request transmitted from the LAN using a network function virtualization (NFV) data segmentation associated with proxy authentication server for the one of the plurality of mobile operator networks.

29. The system of claim 16 wherein the authentication server is a RADIUS server.

30. The system of claim 16 wherein the authentication server is a Diameter server.

31. The system of claim 16 wherein the data traffic monitor is configured to monitor a quantity of data downloaded from the WAN to the wireless communication device via the LAN and to monitor a quantity of data uploaded from the wireless communication device to the WAN via the LAN.

32. The system of claim 16 wherein the off-load operational session may be conducted between the wireless communication device and any of the plurality of APs.

33. The system of claim 16 wherein the wireless communication device is further configured to terminate a cellular network connection between the wireless communication device and the mobile operator network upon establishing the data off-load operational session.

34. The system of claim 16 wherein the billing engine is further configured to establish the secure communication link with the mobile operator network and to transmit the data utilization information for the authenticated wireless communication device associated with the mobile operator network.

35. The system of claim 16 wherein the billing engine is further configured to establish the secure communication link with the mobile operator network and permit access to the data utilization information for the authenticated wireless communication device associated with the mobile operator network.

* * * * *